US012509914B2

(12) United States Patent
Chong

(10) Patent No.: US 12,509,914 B2
(45) Date of Patent: Dec. 30, 2025

(54) DRIVE MECHANISM FOR ELECTRONIC DEADBOLT

(71) Applicant: ASSA ABLOY Americas Residential Inc., New Haven, CT (US)

(72) Inventor: Gerald Chong, Mission Viejo, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 161 days.

(21) Appl. No.: 17/973,599

(22) Filed: Oct. 26, 2022

(65) Prior Publication Data

US 2023/0125130 A1 Apr. 27, 2023

Related U.S. Application Data

(60) Provisional application No. 63/263,065, filed on Oct. 26, 2021.

(51) Int. Cl.
*E05B 47/00* (2006.01)
*E05B 15/10* (2006.01)
(Continued)

(52) U.S. Cl.
CPC ........ *E05B 47/0012* (2013.01); *E05B 15/101* (2013.01); *E05B 43/005* (2013.01);
(Continued)

(58) Field of Classification Search
CPC ............. E05B 47/0676; E05B 47/0684; E05B 2047/002; E05B 2047/0031; E05B 2047/94; E05B 2047/0017; E05B 47/0692
See application file for complete search history.

(56) References Cited

U.S. PATENT DOCUMENTS 5,496,082 A 3/1996 Zuckerman
5,640,863 A * 6/1997 Frolov ................ E05B 63/0069 70/277

(Continued)

FOREIGN PATENT DOCUMENTS

CN 105937335 A * 9/2016
CN 108086802 5/2018

(Continued)

OTHER PUBLICATIONS

PCT International Search Report and Written Opinion in International Application PCT/US2022/078734, mailed Feb. 24, 2023, 10 pages.

(Continued)

*Primary Examiner* — Christine M Mills
*Assistant Examiner* — Peter H Watson
(74) *Attorney, Agent, or Firm* — Merchant & Gould P.C.

(57) ABSTRACT

An electronically-controlled manually-actuated deadbolt lock is provided. The electronically-controlled manually-actuated deadbolt lock includes an internal spring-actuated coupling mechanism that, when a user is authenticated, the coupling mechanism is placed in an engaged position that allows a deadbolt latch to be moved into a locked or unlocked position responsive to a manual rotation of a turn piece. Because the deadbolt latch is manually driven, a warped door condition can be overcome. Additionally, because the deadbolt latch is manually actuated, operation of the electronic motor may be decreased, which may increase battery life.

18 Claims, 21 Drawing Sheets

(51) Int. Cl.
*E05B 43/00* (2006.01)
*E05B 47/06* (2006.01)

(52) U.S. Cl.
CPC .. *E05B 47/0684* (2013.01); *E05B 2047/0017* (2013.01); *E05B 2047/0031* (2013.01); *E05B 2047/0094* (2013.01)

(56) References Cited

U.S. PATENT DOCUMENTS

| | | | |
|---|---|---|---|
| 6,354,121 | B1 | 3/2002 | Frolov |
| 6,651,468 | B2 * | 11/2003 | Aramburu ........... E05B 47/0692 70/279.1 |
| 8,001,818 | B2 | 8/2011 | Imedio Ocana et al. |
| 8,176,761 | B2 | 5/2012 | Sorensen et al. |
| 8,887,542 | B2 | 11/2014 | Bogdanov et al. |
| 8,973,417 | B2 | 3/2015 | Bench et al. |
| 9,027,372 | B2 | 5/2015 | Hickman |
| 9,051,761 | B2 | 6/2015 | Romero |
| 9,803,394 | B2 | 10/2017 | Frolov et al. |
| 10,174,523 | B2 | 1/2019 | Quach et al. |
| 10,174,524 | B2 | 1/2019 | Frolov et al. |
| 10,612,271 | B2 | 4/2020 | Farag et al. |
| 10,648,197 | B2 | 5/2020 | Zheng et al. |
| 10,711,486 | B2 | 7/2020 | Guo et al. |
| 10,738,506 | B2 | 8/2020 | Holmes et al. |
| 11,124,990 | B2 | 9/2021 | Frolov et al. |
| 2011/0079057 | A1 * | 4/2011 | Frolov ................ E05B 47/0673 70/91 |
| 2019/0323263 | A1 | 10/2019 | Kwon |
| 2020/0040605 | A1 | 2/2020 | Farag |
| 2020/0181945 | A1 | 6/2020 | QuachZhao et al. |
| 2020/0318392 | A1 | 10/2020 | Barnett, III et al. |
| 2020/0370338 | A1 | 11/2020 | Holmes et al. |

FOREIGN PATENT DOCUMENTS

| | | | |
|---|---|---|---|
| EP | 1669522 | A2 | 6/2006 |
| EP | 1881135 | A1 | 1/2008 |
| EP | 2233668 | | 9/2010 |
| GB | 2262770 | | 6/1993 |
| WO | 2019/200257 | | 10/2019 |
| WO | 2022/132458 | | 6/2022 |

OTHER PUBLICATIONS

U.S. Appl. No. 63/125,722 entitled "Manual Electronic Deadbolt", filed Dec. 15, 2020, 55 pages.

PCT International Preliminary Report on Patentability in Application PCT/US2022/078734, mailed May 10, 2024, 7 pages.

* cited by examiner

DRIVE MECHANISM FOR ELECTRONIC DEADBOLT

CROSS-REFERENCE TO RELATED APPLICATIONS

This application claims priority to and the benefit of U.S. Provisional Application No. 63/263,065, filed Oct. 26, 2021, which is hereby incorporated by reference in its entirety.

TECHNICAL FIELD

The subject application relates to an electronic lock, in particular to a drive mechanism for the electronic lock and method of actuating the electronic lock.

BACKGROUND

Electronic locks have gained increasing acceptance and widespread use in residential and commercial markets due to various benefits they provide. One such benefit to a user is a convenience of not needing to use a key to open a door. For example, an electronic lock may have a keypad or other means for enabling a user to provide an electronic code, that when authenticated, may cause an electronic motor to retract or extend a deadbolt.

Sometimes, due to age, temperature changes, and/or humidity, doors can experience a warp condition. When this happens, a door may not be able to shut properly and/or a deadbolt may not properly align with an opening of a strike plate positioned in a jamb adjacent the door. Accordingly, an electronic deadbolt that uses an electronic motor to retract or extend the deadbolt may be unable to overcome the warped door condition, and the deadbolt may not be able to fully extend into the opening to place the door in a locked state. Additionally or alternatively, in an attempt to overcome the warped door condition to lock or unlock the deadbolt, additional force may be applied by the electronic motor, which may decrease battery life of the electronic lock.

While some existing solutions exist that selectively engage a manual turn piece with a deadbolt in response to providing a credential to an electronic lock, such solutions are not widespread, and do not have significant variety of adjustability for various door installations.

SUMMARY

Aspects of the present disclosure relate generally to an electronically-controlled, manually-actuated deadbolt lock. The electronically-controlled, manually-actuated deadbolt lock includes an internal spring-actuated coupling mechanism that, when a user is authenticated (e.g., a correct passcode or other security token is entered into a keypad of the lock, a biometric input is received, a radio frequency identification (RFID) signal is received, etc.), is placed in an engaged position that allows the deadbolt latch to be moved into a locked or unlocked position responsive to a manual rotation of a manual turn piece. Because the deadbolt latch is manually driven, a warped door condition can be overcome without requiring additional electrical energy from a motor. Additionally, when the deadbolt latch is manually actuated, operation of the electronic motor may be decreased, which may increase battery life. In particular arrangements, a selective connection may be made between a manual turn piece and a torque blade to accommodate varied handing positions while allowing the manual turn piece to return to a single, default starting position.

In a first aspect, an electronically-controlled, manually-actuated lock includes a motor and an actuating spindle actuatable by the motor and positioned to rotate around a first axis in response to actuation of the motor. The actuating spindle includes a driving pin that engages a transmission spring such that, upon rotation of the actuating spindle, a position of the transmission spring changes relative to the driving pin along the first axis between a neutral position and a biasing position. The lock includes a drive mechanism including a coupling and a driver, as well as a manual turn piece affixed to the driver and rotatable with the driver. The lock includes a pin coupled to the coupling and movable between an engaged position, in which the pin is coupled to the driver, and a disengaged position, in which the pin is disengaged from the driver, the pin being biased toward the disengaged position by a pin spring. The lock includes an actuator at least partially surrounding the drive mechanism, the actuator being engageable by the transmission spring at least when the transmission spring is in the biasing position, the actuator being movable between a first position and a second position. The actuator remains in the first position when the transmission spring is in the neutral position and, is biased toward the second position when the transmission spring is in the biasing position. Biasing the actuator toward the second position compresses the pin spring, and pushes the pin toward the engaged position. The lock includes a deadbolt latch assembly including a latch bolt movable between a locked position and an unlocked position and a torque blade rotatably coupled to the coupling and drivably coupled to the latch bolt. When the pin is in the engaged position, manual rotation of the manual turn piece rotates the torque blade and drives movement of the latch bolt between the locked position and the unlocked position.

In a second aspect, a method of actuating an electronic lock is disclosed. The method includes, in response to receiving a valid user credential input, actuating a motor via a control circuit to rotate an actuating spindle around a first axis, the actuating spindle comprising a driving pin that engages a transmission spring to move the transmission spring along the first axis from a neutral position to a biasing position. Movement of the transmission spring to the biasing position biases a movable actuator from a first position to a second position. Biasing the actuator to the second position pushes a pin toward an engaged position. In the engaged position, the pin rotationally joins a torque blade to a manual turn piece on an exterior assembly of the electronic lock.

In a third aspect, an electronic lock for use on a door separating an exterior space from a secured space is disclosed. The electronic lock includes a deadbolt latch assembly including a latch bolt movable between a locked position and an unlocked position and a torque blade drivably coupled to the latch bolt. The electronic lock further includes an interior assembly comprising an interior manual turn piece operatively connected to the torque blade. The electronic lock also includes an exterior assembly. The exterior assembly includes a motor and an actuating spindle actuatable by the motor and positioned to rotate around a first axis in response to actuation of the motor. The actuating spindle including a driving pin that engages a transmission spring such that, upon rotation of the actuating spindle, a position of the transmission spring changes relative to the driving pin along the first axis between a neutral position and a biasing position. The exterior assembly further includes a drive mechanism including a coupling and a driver, the coupling coupled to the torque blade. The exterior assembly includes an exterior manual turn piece affixed to the driver and rotatable with the driver. The exterior assembly includes a pin coupled to the coupling and movable between an engaged position, in which the pin is coupled to the driver, and a disengaged position, in which the pin is disengaged from the driver, the pin being biased toward the disengaged position by a pin spring. The exterior assembly includes an actuator at least partially surrounding the drive mechanism, the actuator being engageable by the transmission spring at least when the transmission spring is in the biasing position, the actuator being movable between a first position and a second position. The actuator remains in the first position when the transmission spring is in the neutral position, and is biased toward the second position when the transmission spring is in the biasing position. Biasing the actuator toward the second position compresses the pin spring, and pushes the pin toward the engaged position. When the pin is in the engaged position, manual rotation of the exterior manual turn piece rotates the torque blade and drives movement of the latch bolt between the locked position and the unlocked position.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 2:
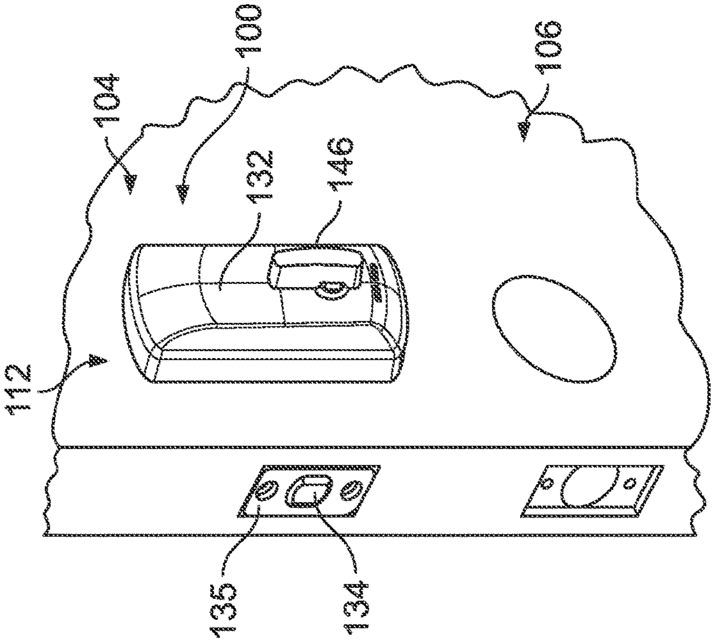
FIG. 2 illustrates another perspective view of the electronic lock being installed on an exterior side of the door.

As briefly described above, embodiments of the present invention are directed to an electronic lock that includes a manual mechanism for extending or retracting a deadbolt. In particular, embodiments of the present invention are directed to a drive mechanism that electronically engages a manual mechanism with the deadbolt upon receipt of an appropriate user credential.

In some instances, electronic locks have been developed which utilize a motor to selectively connect a manual turn piece to a drive mechanism for extension or retraction of a deadbolt. In such devices, the manual turn piece is typically allowed to rotate freely when not engaged to the drive mechanism. When a credential is presented (e.g., a PIN code) the manual turn piece will then be re-engaged with the drive mechanism in any of a variety of rotational positions, and a user will rotate the manual turn piece to retract or extend the deadbolt.

While such electronic locks are effective, the above rotational freedom of a manual turn piece provides limits on the types of manual turn pieces that may be used. Typically, a knob is used, which may be rotated in either direction on an as-needed basis. However, in circumstances, it may be desired for such a manual turn piece to return to a default, or "home" position when released. In such circumstances, a "home" position may correspond to either the retracted or extended position of the deadbolt, and the manual turn piece may need to be rotated in either direction, depending on the orientation of the lock and deadbolt relative to the door (i.e., the handing orientation, or "handedness" of the lock).

In accordance with aspects of the present disclosure, a drive mechanism for an electronic lock is disclosed that utilizes a clutch arrangement. When a credential is received, the clutch arrangement may be actuated, causing a pin engagement piece to engage the manual turn piece with a coupling that is attached to a torque blade. Specifically, the pin engagement piece may couple a driver that is keyed for connection to the manual turn piece to the coupling. A user may then turn the manual turn piece in a desired direction, causing rotation of the torque blade and extension or retraction of a deadbolt. When the user releases the turn piece, the turn piece and driver will return to a default position, while the coupling, torque blade, and deadbolt will remain in the position to which they were moved while coupled to the turn piece.

In accordance with example embodiments, the drive mechanism may readily be adapted for use on doors having a right-handed orientation or a left-handed orientation, with the exterior manual turn piece having a symmetrical, common range of motion regardless of the handing orientation that is used.

International Publication No. WO 2022/0132458, published on Jun. 23, 2022, and entitled "Manual Electronic Deadbolt," which claims priority to U.S. Provisional Patent Application No. 63/125,722, filed on Dec. 15, 2020, describes a further electronic lock that uses a manual turn piece that is selectively engaged to a torque blade for moving a deadbolt between extended and retracted positions. That application is hereby incorporated by reference in its entirety. In that arrangement, a manual turn piece (e.g., in the form of a bezel) may be selectively connected to a torque blade by a pin that may be inserted into a coupling at any of a plurality of locations. The pin extends through a sleeve coupled to the bezel, and therefore couples the bezel to the coupling attached to the torque blade.

In accordance with the current disclosure, the pin engagement piece may be used in place of the pin, and may be actuatable by a motor between a disengaged state, in which the pin engagement piece is not engaged with the manual turn piece, and an engaged state in which the pin engagement piece is engaged with both the manual turn piece and coupling with the torque blade. By decoupling the pin engagement piece from the manual turn piece during the disengaged state, additional flexibility is provided with respect to the manner in which a handing of the electronic lock can be configured, since the position of the pin engagement piece is decoupled from the position of the manual turn piece. This assists in setting a configuration for each of a left-handed or right-handed door preparation in which a torque blade can be positioned at an appropriate angular orientation to be received by the deadbolt latch in a manner that is appropriate for the particular installation.

Figure 1:
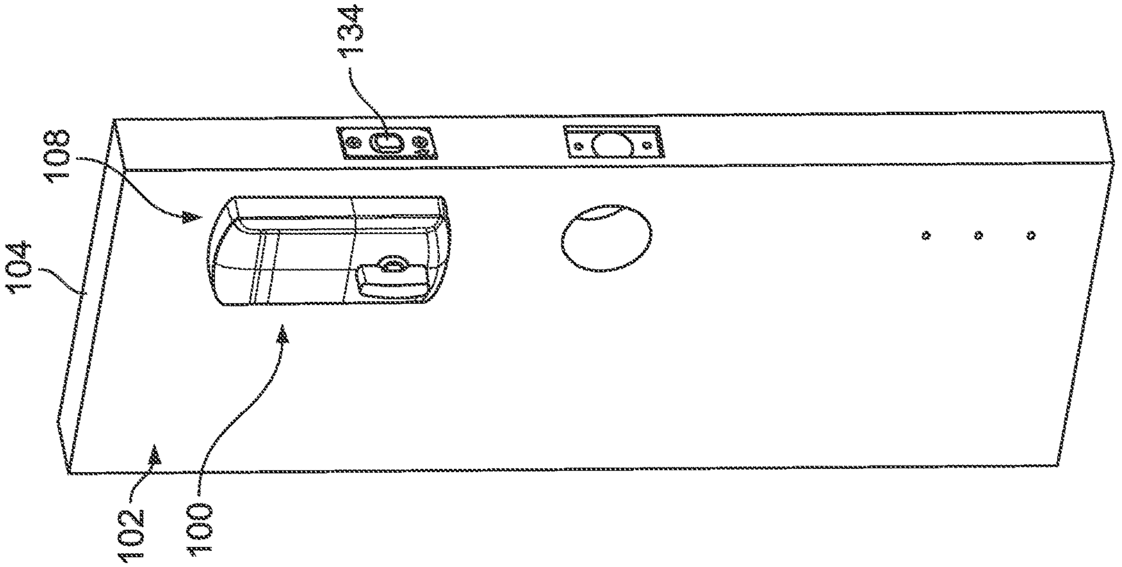
FIG. 1 illustrates a perspective view of an example electronic lock according to an embodiment, the electronic lock shown being installed on an interior side of a door.
Figure 3:
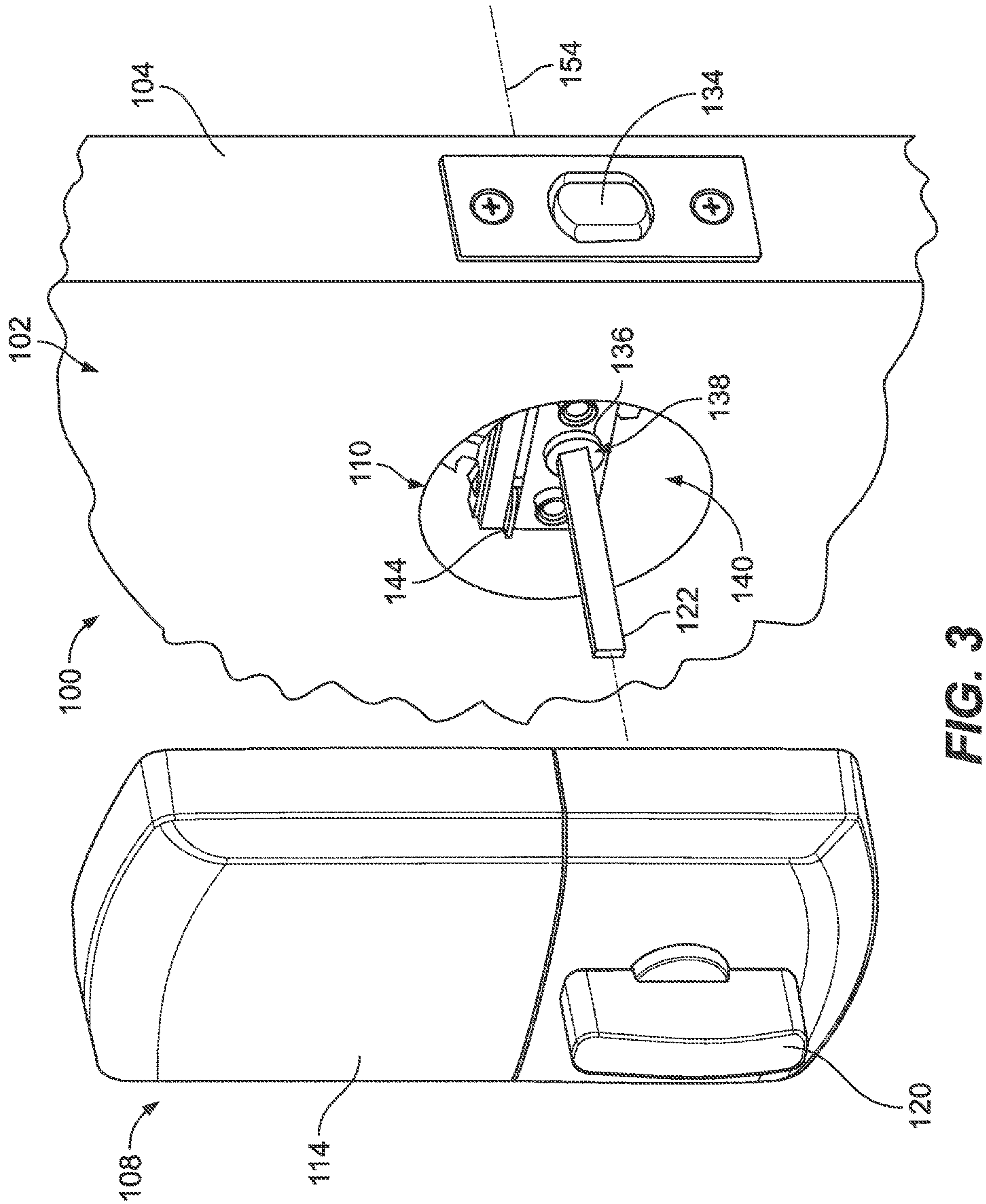
FIG. 3 illustrates a partially-exploded perspective view of a portion of an interior assembly and a deadbolt assembly of the electronic lock.
Figure 4:
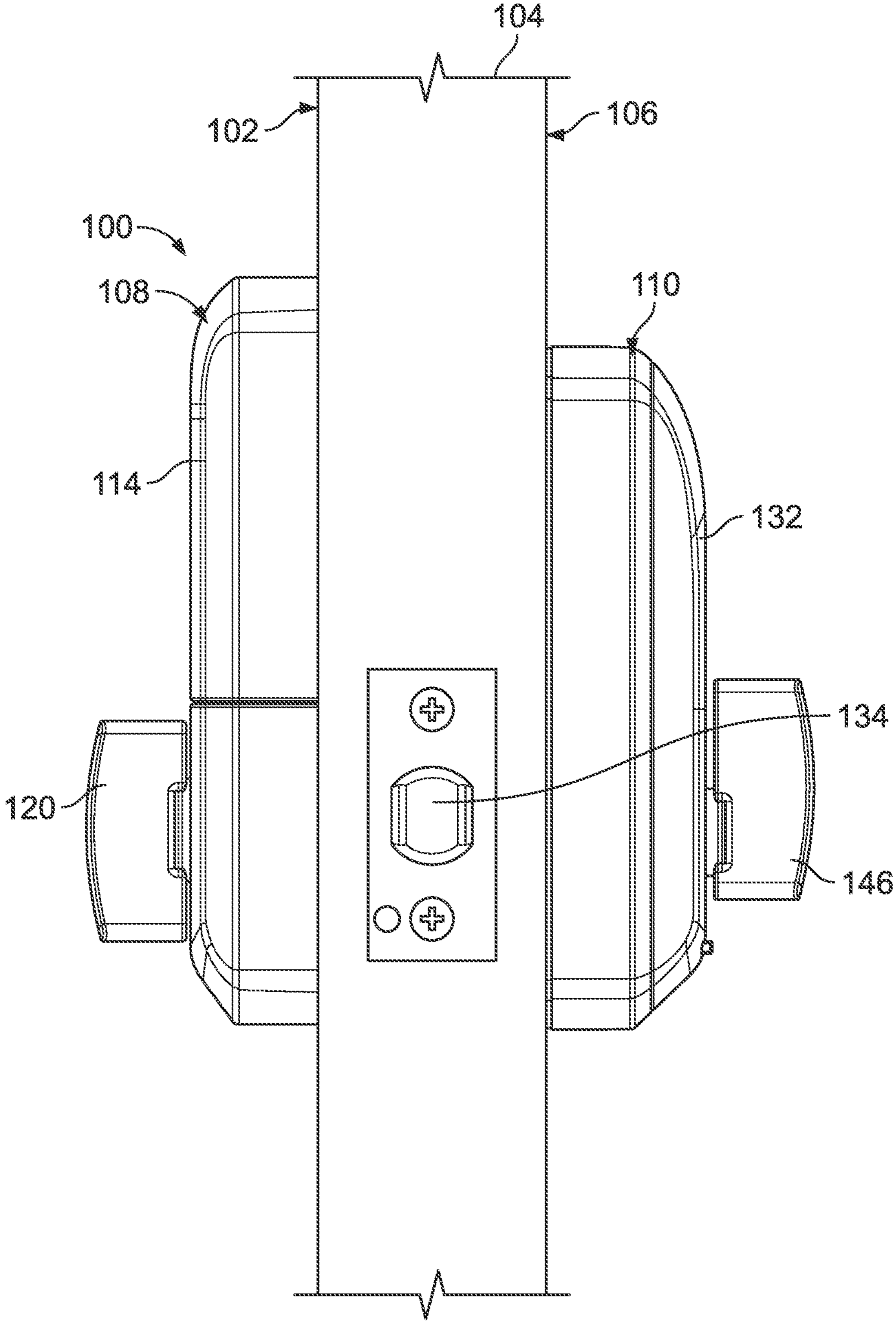
FIG. 4 illustrates a side view of the electronic lock installed in the door.
Figure 5:
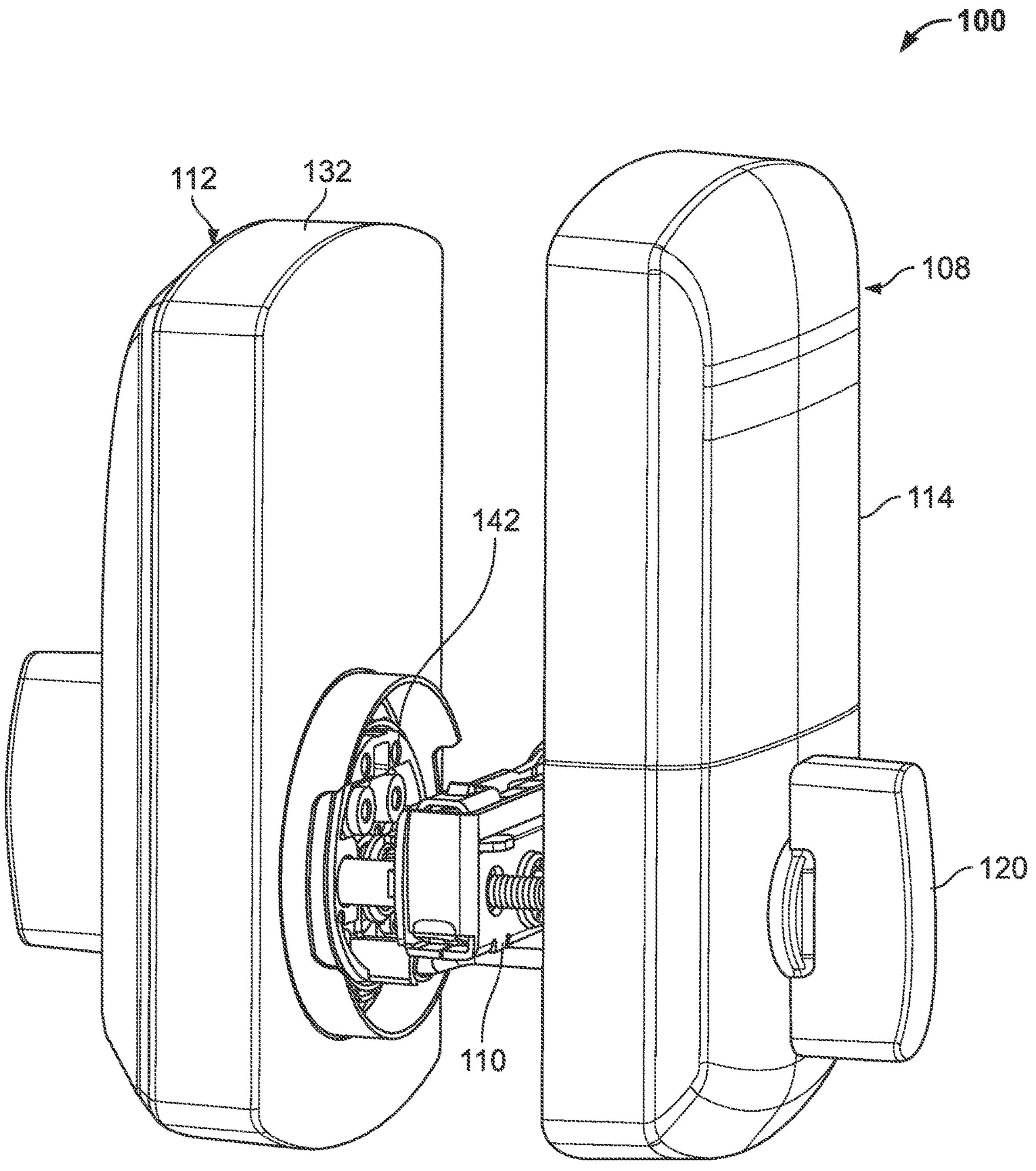
FIG. 5 illustrates a front perspective view of the interior assembly and a rear perspective view of a portion of an exterior assembly of the electronic lock.
Figure 6:
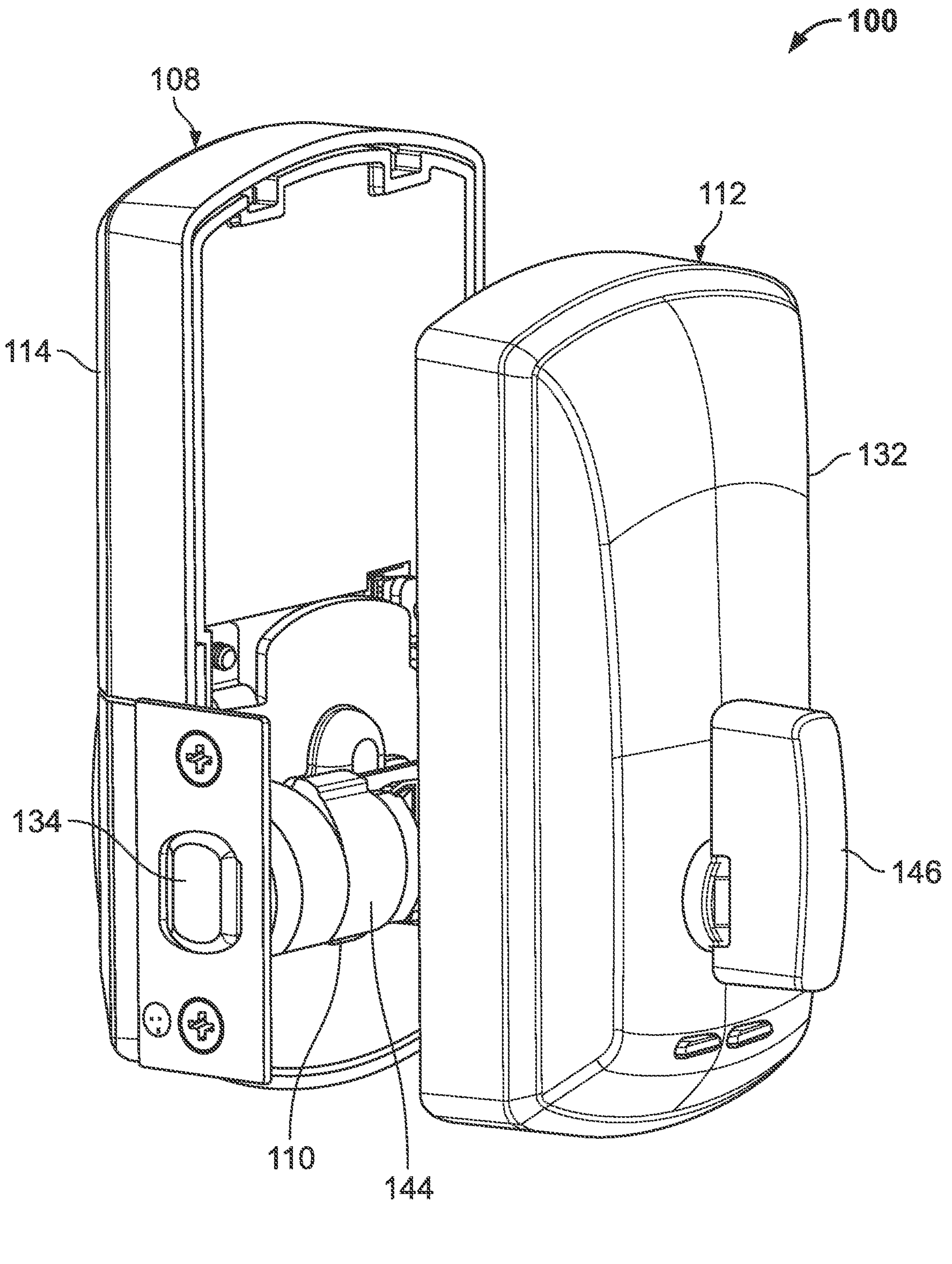
FIG. 6 illustrates a front perspective view of the exterior assembly and a rear perspective view of a portion of the interior assembly of the electronic lock.
Figure 7:
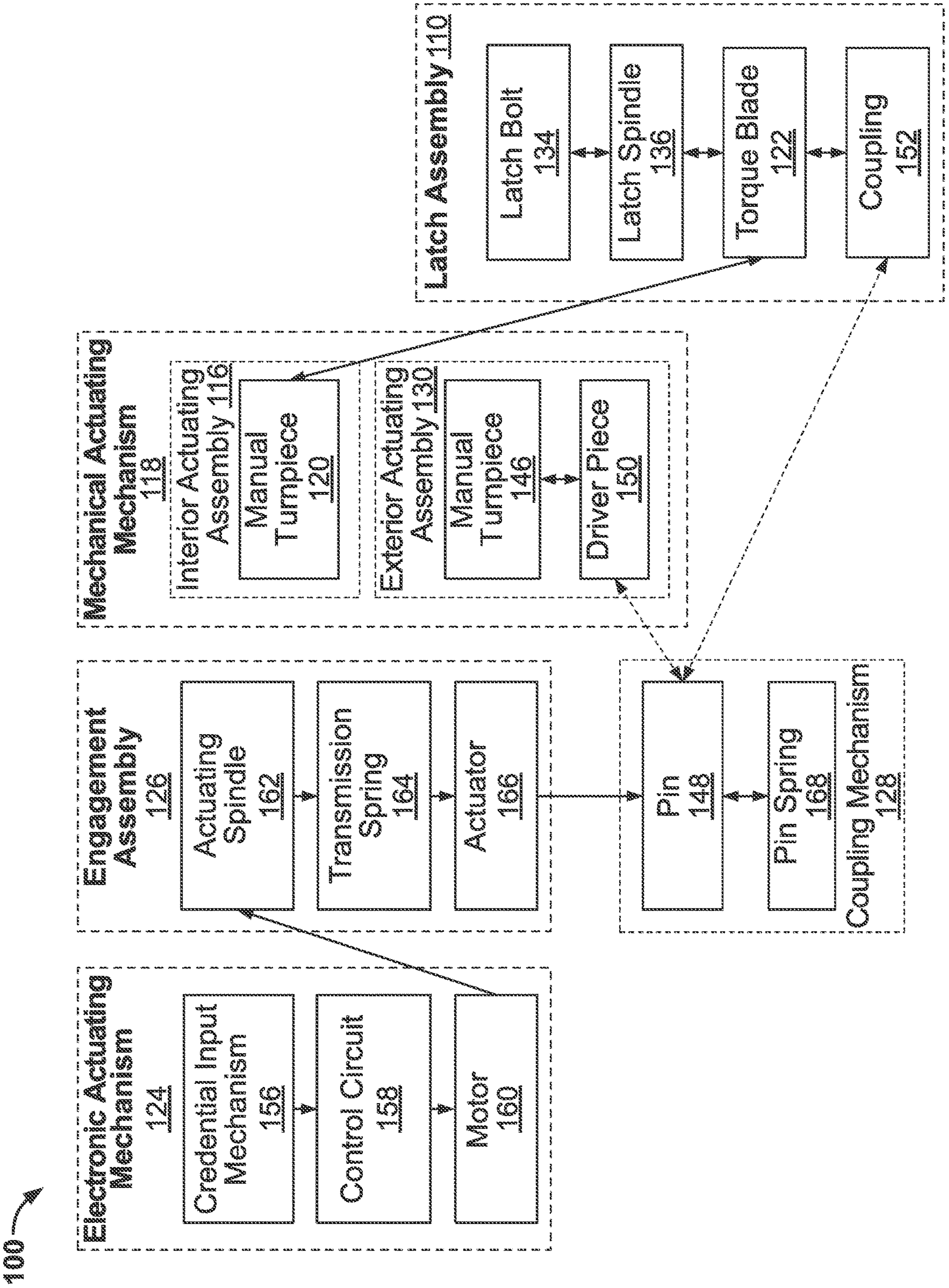
FIG. 7 illustrates a schematic representation of the electronic lock shown in FIGS. 1-6.

FIG. 1 illustrates a perspective view of an example electronic lock 100 according to an embodiment, the electronic lock 100 shown being installed on an interior side 102 of a door 104. FIG. 2 illustrates another perspective view of the electronic lock 100 being installed on an exterior side 106 of the door 104. FIG. 3 illustrates a partially-exploded perspective view of a portion of an interior assembly 108 and a deadbolt latch assembly 110 of the electronic lock 100. FIG. 4 illustrates a side view of the electronic lock 100 installed in the door 104. FIG. 5 illustrates a front perspective view of the interior assembly 108 and a rear perspective view of a portion of an exterior assembly 112 of the electronic lock 100. FIG. 6 illustrates a front perspective view of the exterior assembly 112 and a rear perspective view of a portion of the interior assembly 108 of the electronic lock 100. FIG. 7 illustrates a schematic representation of the electronic lock 100 shown in FIGS. 1-6. FIG. 7 is a block diagram showing a schematic representation of the electronic lock 100 and the schematic representation provided in FIG. 7 is intended to simplify and facilitate discussion herein of functional relationships between components of the electronic lock 100. References may also be to the other figures described herein, which provide various perspective representations of the electronic lock 100 that are intended to facilitate communication of the assembly and mating relationships of these components.

Referring concurrently to FIGS. 1-7, the electronic lock 100 is configured to be mounted on the door 104. The door 104, can be an exterior entry door or an interior door, and has the interior side 102 and the exterior side 106. With an exterior entry door 104, for example, the exterior side 106 may be outside a building, while the interior side 102 may be inside a building. With an interior door 104, the exterior side 106 may be inside a building, but may refer to outside a room secured by the electronic lock 100, and the interior side 102 may refer to inside the secured room. The electronic lock 100 generally includes the interior assembly 108, the exterior assembly 112, and the deadbolt latch assembly 110. Typically, the interior assembly 108 is mounted to the interior side 102 of the door 104 and the exterior assembly 112 is mounted to the exterior side 106 of the door 104.

An interior housing 114 generally houses internal components of the interior assembly 108 as explained below, and includes interior actuating assembly portions 116 of a mechanical actuating mechanism 118 (both schematically illustrated in FIG. 7) embodied as an interior turn piece 120 that may be rotated by a user to manually operate the deadbolt latch assembly 110, e.g., via engagement with a torque blade 122. In an aspect, the turn piece 120 may be oriented substantially vertically when the deadbolt latch assembly 110 is retracted. In other aspects, the turn piece 120 may be oriented substantially horizontal when the deadbolt latch assembly 110 is retracted and oriented substantially vertically when the deadbolt latch assembly 110 is thrown. The exterior assembly 112 generally includes an electronic actuating mechanism 124, an engagement assembly 126, a coupling mechanism 128, and exterior actuating assembly 130 portions of the mechanical actuating mechanism 118 (all schematically illustrated in FIG. 7) housed within an exterior housing 132.

The deadbolt latch assembly 110 is best shown in FIGS. 3 and 6. The deadbolt latch assembly 110 generally includes the torque blade 122, a latch bolt 134 that extends into a locked position and retracts into an unlocked position relative to a face plate 135, and a latch crank 136 that connects the torque blade 122 to the latch bolt 134 via aperture 138. As shown in the partially exploded perspective view of FIG. 3, the deadbolt latch assembly 110 is at least partially mounted in a bore 140 formed in the door 104 and is designed to be actuated manually by the turn piece 120 to extend and retract the latch bolt 134. The deadbolt latch assembly 110 may include a housing 144 that carries the extendable/retractable latch bolt 134. The latch bolt 134 moves linearly in and out of the housing 144. As shown in FIG. 5, an adaptor 142 may extend from the rear of the exterior housing 132.

The torque blade 122 is also configured to engage with the exterior actuating assembly 130 and be selectively manually driven by a rotation of a manual exterior turn piece 146 of the exterior actuating assembly 130. For example, when the electronic lock 100 is in an engaged state, the exterior actuating assembly 130 is drivably coupled to the torque blade 122 via a pin 148 of the coupling mechanism 128 being coupled to a driver piece 150 of the exterior actuating assembly 130 and a coupling 152 of the deadbolt latch assembly 110 that is fixed to the torque blade 122 (all schematically illustrated in FIG. 7). The driver piece 150 is coupled to the manual exterior turn piece 146 and housed within the exterior housing 132. The driver piece 150 rotates with the manual exterior turn piece 146 to, in turn, rotate the pin 148 and coupling 152, thereby rotating the torque blade 122 around an axis 154 to operate the latch bolt 134.

When the electronic lock 100 is in an unengaged state, the exterior actuating assembly 130 is drivably decoupled from the torque blade 122, since the pin 148 is decoupled from the driver piece 150. Therefore, the manual exterior turn piece 146 is incapable of rotating the torque blade 122 to operate the latch bolt 134. In example embodiments described below, the manual exterior turn piece 146 is biased toward a predetermined position in which the coupling mechanism 128 is engageable by the exterior actuating assembly 130 (e.g., a default position, such as the position seen in FIGS. 2, 4, and 6).

Accordingly, the torque blade 122 can be manually rotated when the turn piece 120 located on the interior side 102 of the door 104 is manually turned, or when the electronic lock 100 is placed in an engaged state and the manual exterior turn piece 146 is manually rotated. According to an aspect, the engagement state (i.e., engaged state versus disengaged state) of the electronic lock 100 is electronically controlled via the electronic actuating mechanism 124.

In some example embodiments, the deadbolt latch assembly 110 may further be moveable between locked and unlocked positions via receipt of a valid mechanical key inserted into and turned within a lock cylinder (not shown). Such a configuration is shown in International Publication No. WO 2022/132458, previously incorporated by reference. In example embodiments, such a cylinder plug may be a rekeyable cylinder plug, such as is described in U.S. Patent Publication No. 2020/0040605, entitled "Rekeyable Lock with Small Increments", or U.S. Pat. No. 10,612,271, entitled "Rekeyable Lock Cylinder With Enhanced Torque Resistance", the disclosures of which are hereby incorporated by reference in their entireties.

The electronic actuating mechanism 124 includes a credential input mechanism 156, a control circuit 158, and a motor 160. The credential input mechanism 156 is configured to receive and communicate an electronic credential (e.g., a passcode or security token entered via a keypad (not shown), a biometric input received via a biometric sensor (not shown), a wireless signal received via a wireless interface (not shown), or other electronic credential) to the control circuit 158 for authentication of a user. Example wireless interfaces useable as a credential input mechanism 156 are described below in conjunction with FIG. 27.

One or more other types of user interface devices can be incorporated into the electronic lock 100. For example, in example implementations, the exterior assembly 112 can include a biometric interface (e.g., a fingerprint sensor, retina scanner, or camera including facial recognition) by which biometric input can be used; an audio interface by which voice recognition can be used; or a wireless interface by which wireless signals can be used to actuate the engagement assembly 126. According to another embodiment, a keypad may or may not present. In some examples, a user may use a Bluetooth® or Wi-Fi-®-enabled device that transmits signals that may allow the motor to actuate when the device is paired with the electronic lock 100. In other examples, a user may use an RFID tag that allows the motor to actuate when the correct RFID tag is detected. In further embodiments, alternative methods of electronically communicating with the motor are contemplated. When a user inputs a valid passcode or other electronic credential via the credential input mechanism 156 that is recognized by the control circuit 158, the electrical motor 160 is energized to actuate the engagement assembly 126 to couple or decouple the exterior actuating assembly 130 to/from the deadbolt latch assembly 110 via the coupling mechanism 128.

The control circuit 158 comprises electronic circuitry for the electronic lock 100. In some examples, the control circuit 158 is a printed control circuit configured to receive the credential input of the credential input mechanism 156. When the control circuit 158 receives the correct input, the control circuit 158 sends a signal to the motor 160. The control circuit 158 is configured to execute a plurality of software instructions (i.e., firmware) that, when executed by the control circuit 158, cause the electronic lock 100 to implement methods and otherwise operate and have functionality as described herein. The control circuit 158 may comprise a device commonly referred to as a processor, e.g., a central processing unit (CPU), digital signal processor (DSP), or other similar device, and may be embodied as a standalone unit or as a device shared with components of the electronic lock 100. The control circuit 158 may include memory communicatively interfaced to the processor, for storing the software instructions. Alternatively, the electronic lock 100 may further comprise a separate memory device for storing the software instructions that is electrically connected to the control circuit 158 for the bi-directional communication of the instructions, data, and signals therebetween.

In example embodiments, the engagement assembly 126 and coupling mechanism 128 may include an engagement means, similar to that described in U.S. Patent Publication No. 2020/0080343, entitled "Locking Assembly with Spring Mechanism", the disclosure of which is hereby incorporated by reference in its entirety.

The engagement assembly 126 includes an actuating spindle 162, a transmission spring 164, and a movable actuator 166. The coupling mechanism 128 includes the pin 148 and a pin spring 168. The components of the electronic actuating mechanism 124, the engagement assembly 126, the coupling mechanism 128, the mechanical actuating mechanism 118, and the deadbolt latch assembly 110 that are housed within the exterior assembly 112 are described further below in reference to FIG. 8.

Figure 8:
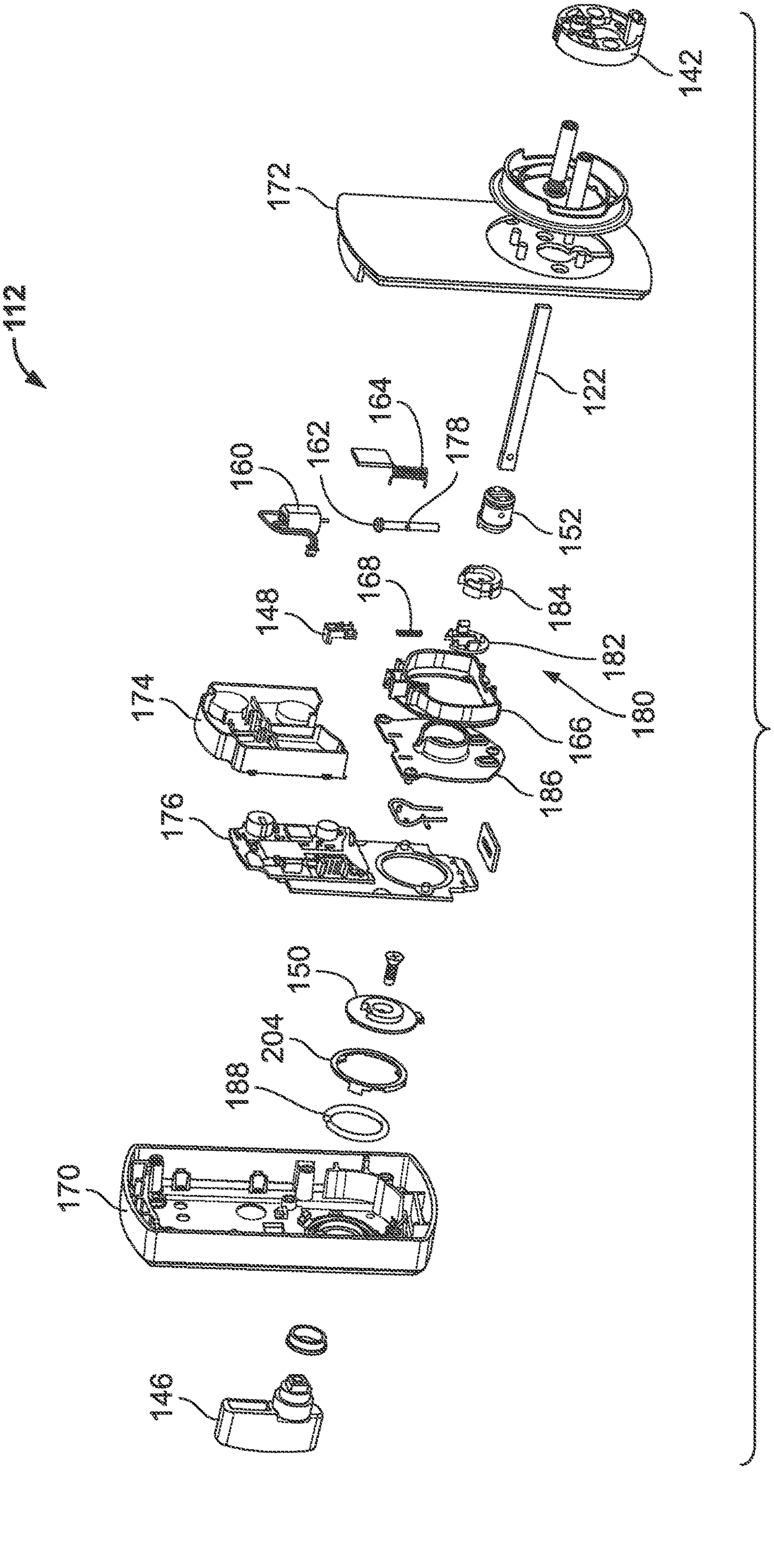
FIG. 8 illustrates an exploded view of the internal components of the exterior assembly as viewed from a rear perspective view.

FIG. 8 illustrates an exploded view of the internal components of the exterior assembly 112 as viewed from a rear perspective view. The components of the exterior assembly 112 are retained within a deadbolt enclosure formed by a deadbolt rose 170 and a back plate 172. A cradle 174 supports one or more printed circuit boards (PCBs) 176 that form at least a portion of the control circuit 158 of the electronic actuating mechanism 124 (shown in FIG. 7). The cradle 174 also supports the motor 160 that is coupled in operative communication with the PCB 176. The actuating spindle 162 is coupled to the motor 160 such that the motor 160 selectively drives rotation of the spindle 162. The actuating spindle 162 is rotatably supported by the cradle 174 and is actuatable by the motor 160 in response to an actuation signal via the PCB 176. The actuating spindle 162 has a driving pin 178 that engages the transmission spring 164 so that upon rotation of the actuating spindle 162, a position of the transmission spring 164 changes relative to the driving pin 178. The driving pin 178 and transmission spring 164 are described further below in reference to FIGS. 9-11.

The torque blade 122 extends along and is rotatable around the horizontal axis 154 (shown in FIG. 3). The torque blade 122 driving couples to the deadbolt latch assembly 110 (also shown in FIG. 3) so as to move the latch bolt 134 between the locked and unlocked position. The torque blade 122 also couples to a drive mechanism 180 of the manual exterior turn piece 146. The drive mechanism 180 includes the coupling 152, a pin cover 182 affixed to the coupling 152, and the driver 150. The pin cover 182 couples to the coupling 152 via a pin housing 184. One end of the torque blade 122 is fixed to the coupling 152. The coupling 152 is also connected to the pin cover 182 and pin housing 183 at the other end. The drive mechanism 180 being coupled to the torque blade 122 is selectively rotatable around the axis 154. The manual exterior turn piece 146 is affixed to the driver 150 and is rotatable with the driver 150.

The pin 148 of the coupling mechanism 128 is housed at least partially within the pin housing 184 and pin cover 182, and is selectively coupled to the driver 150 so as to engage and disengage the manual exterior turn piece 146 with the torque blade 122. The pin 148 is moveable between an engaged and a disengaged position as described further below in reference to FIGS. 12-15. When the pin 148 is in the engaged position, manual rotation of the manual exterior turn piece 146 rotates the torque blade 122 and drives movement of the latch bolt 134 between the locked and unlocked positions. In the example, the pin 148 is biased toward the disengaged position by the pin spring 168. A guide plate 186 is fixed within the deadbolt rose 170 and is configured to guide movement of the actuator 166.

The actuator 166 of the engagement assembly 126 (shown in FIG. 7) at least partially surrounds the drive mechanism 180 and is movable between at least two positions and is selectively engageable with the transmission spring 164. When engaged with the transmission spring 164, the actuator 166 is configured to drive the movement of the pin 148 and selectively engage therewith. The movement of the actuator 166 is described further below in reference to FIGS. 9 and 10. Additionally, a turn piece spring 188 is provided so as to cause the manual exterior turn piece 146 to return to a single, default position (e.g., upright in the example shown).

Figure 9:
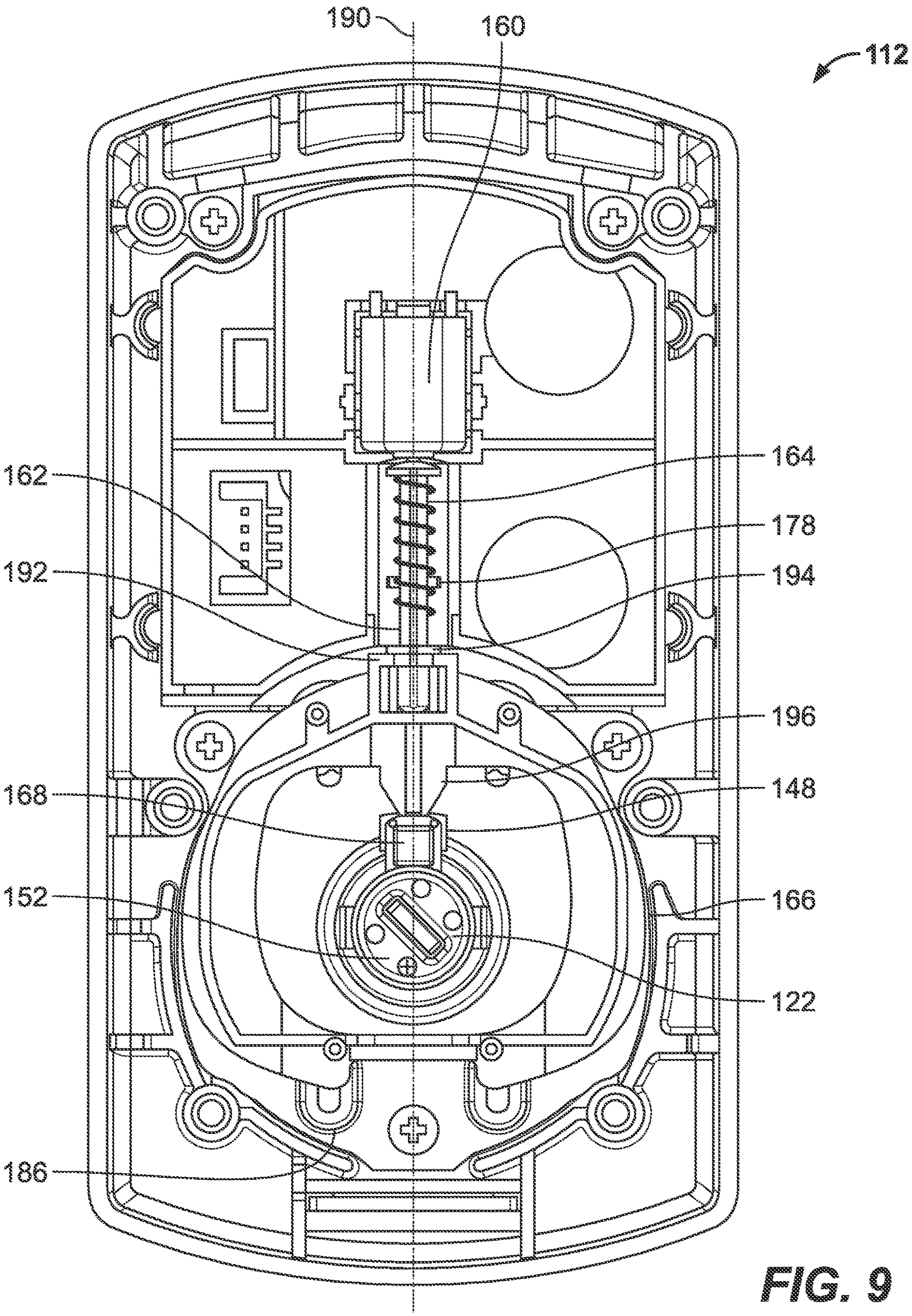
FIG. 9 illustrates a rear internal view of the exterior assembly with a transmission spring in a neutral position.
Figure 10:
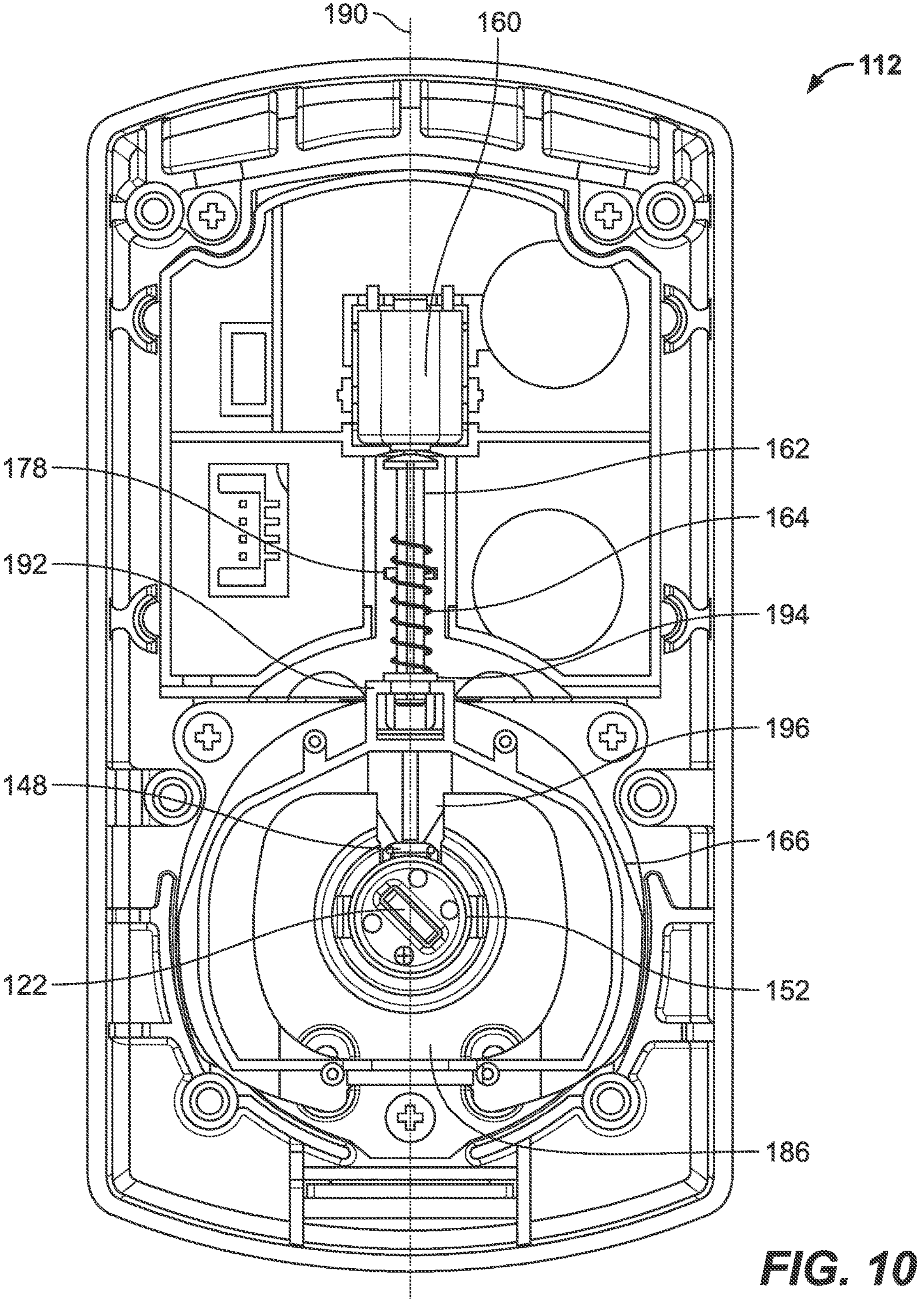
FIG. 10 illustrates a rear internal view of the exterior assembly with the transmission spring in a biasing position.

FIG. 9 illustrates an internal view of the exterior assembly 112 with the transmission spring 164 in a neutral position. FIG. 10 illustrates an internal view of the exterior assembly 112 with the transmission spring 164 in a biasing position. Referring concurrently to FIGS. 9 and 10, the motor 160 is operatively coupled to the actuating spindle 162 and is configured to rotate the actuating spindle 162 around an axis 190. The actuating spindle 162 is a rod-shaped mechanism oriented around the axis 190, and for example, vertically within the exterior assembly 112. The vertical axis 190 is substantially orthogonal to the horizontal axis 154 (shown in FIG. 3) that the torque blade 122 extends along. The actuating spindle 162 is connected to the motor 160. The actuating spindle 162 includes the spring driving pin 178 extending therefrom and that engages the transmission spring 164 such that, upon rotation of the actuating spindle 162, the transmission spring 164 moves upward or downward relative to the spring driving pin 178 along the axis 190 between a neutral position (as in FIG. 9) and a biasing position (as in FIG. 10).

For example, the motor 160 can rotate the actuating spindle 162 in both a clockwise and a counterclockwise direction around the axis 190, such that rotation in one direction causes the transmission spring 164 to move upward to the neutral position (e.g., FIG. 9), and rotation in the other direction causes the transmission spring 164 to move downward along the actuating spindle 162 away from the motor 160 and toward the movable actuator 166 to the biasing position (e.g., FIG. 10). The spring driving pin 178 enables rotation of the actuating spindle 162 around the axis 190 to drive linear movement of the transmission spring 164 along the axis 190. The movable actuator 166 is operatively engageable by the transmission spring 164 at least when the transmission spring 164 is in the biasing position.

A distal end of the actuating spindle 162 (e.g., the end opposite of the motor 160), is slidable engaged with a receiver 192 positioned at the top of the actuator 166. A washer 194 is disposed between the actuator 166 and the transmission spring 164 at the top of the receiver 192. The washer 194 is also slidably received on the distal end of the actuating spindle 162 such that as the transmission spring 164 moves toward the biasing position, the transmission spring 164 pushes the washer 194 downward along the axis 190 so as to engage the actuator 166 and also push the actuator 166 downward. The actuator 166 is slidably coupled to the guide plate 186 so that the actuator 166 is also moveable along the axis 190. As shown in FIG. 9, the actuator 166 is in an upward position, while in FIG. 10 the actuator 166 is moved downwards via engagement of the transmission spring 164.

In the example shown, the actuator 166 also includes a pin portion 196 that extends downward away from the motor 160 and opposite of the receiver 192 of the actuating spindle 162. The pin portion 196 has a nose that is oriented toward the pin 148. As mentioned above, the actuator 166 is movable between a first position and a second position. The actuator 166 remains in the first position (e.g., FIG. 9) when the transmission spring 164 is in the neutral position. When the transmission spring 164 is in the neutral position, the actuator 166 is biased upward by the pin spring 168 biasing against the pin 148, which presses upward on the pin portion 196 so as to urge the actuator 166 towards the first position. The actuator 166 is biased toward the second position (e.g., FIG. 10) when the transmission spring 164 is in the biasing position, since the transmission spring 164 will generally be selected to have a compressive force that is greater than the resisting force of the pin spring 168.

Biasing the actuator 166 toward the second position causes the coupling mechanism 128 (e.g., the pin 148 and the spring 168 and schematically illustrated in FIG. 7) to drivably couple the exterior actuating assembly 130 (e.g., the exterior turn piece 146 and the driver 150 and also schematically illustrated in FIG. 7) to the deadbolt latch assembly 110 (shown in FIG. 3). More specially, the coupling mechanism 128 selectively couples the coupling 152 attached to the torque blade 122 to the driver 150 so that the exterior turn piece 146 can operate the deadbolt latch assembly 110.

Figure 11:
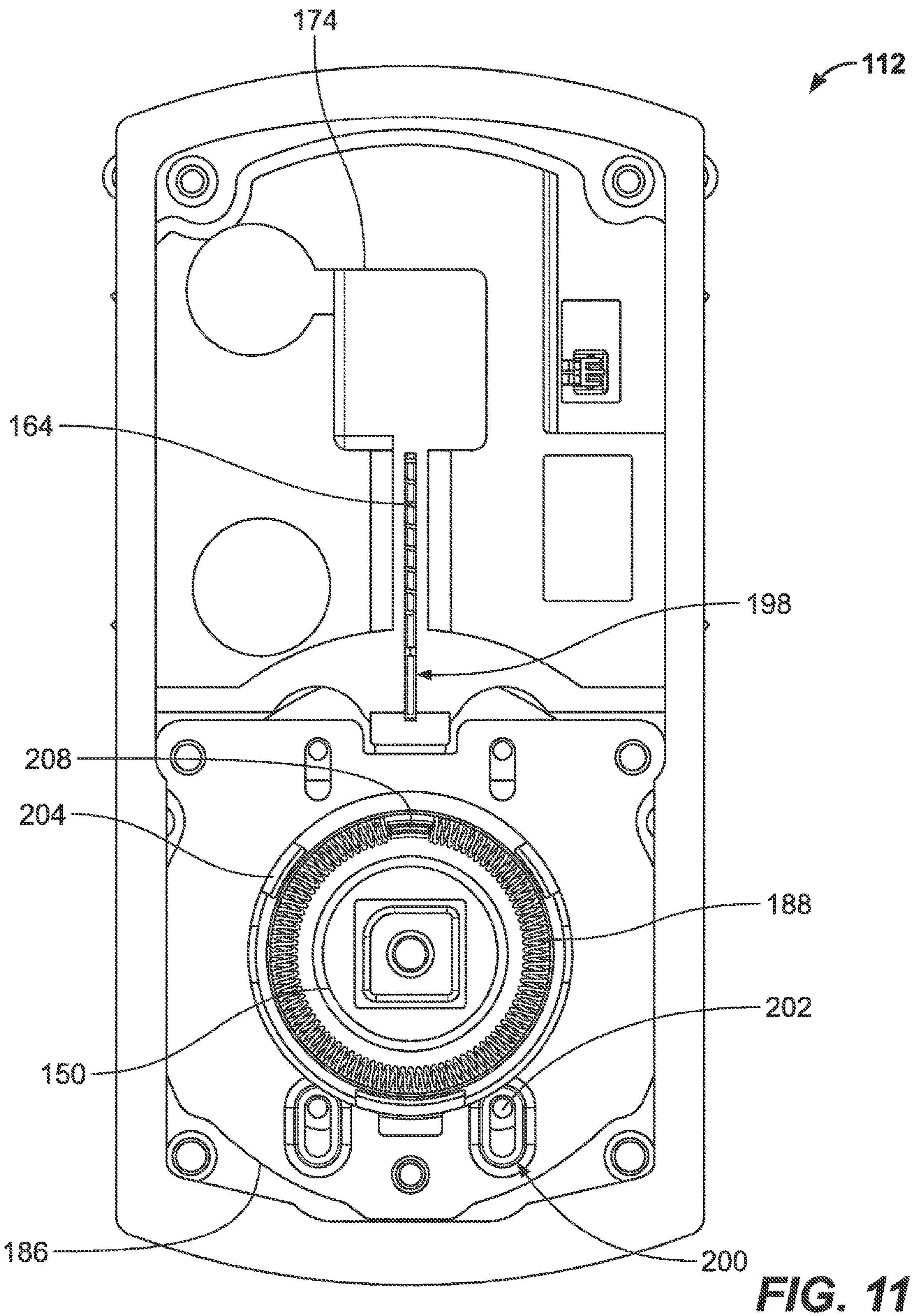
FIG. 11 illustrates a front internal view of the exterior assembly with the transmission spring in the neutral position.

FIG. 11 illustrates a front internal view of the exterior assembly 112 with the transmission spring 164 in the neutral position. In FIG. 11, the manual exterior turn piece 146, the deadbolt rose 170, and the PCBs 176 (all shown in FIG. 8) have been removed for clarity. The cradle 174 defines a slot 198 that extends in the vertical axis direction. The transmission spring 164 has a U-shaped configuration (as best shown in FIG. 8) with a vertical compression section and two opposing horizontal legs. The horizontal legs of the transmission spring 164 are at least partially slidably retained within the slot 198 as it is moved by the rotation of the actuating spindle 162 (shown in FIGS. 9 and 10).

Additionally, the guide plate 186 has one or more channels 200 that are configured to slidably receive corresponding pins 202 extending from the actuator 166 (shown in FIGS. 9 and 10) so that the actuator 166 can mount to the rear side and slidably move up and down. On the front side of the guide plate 186, the driver 150 is mounted and can rotate relative thereto. The driver 150 couples to the manual exterior turn piece 146 and selectively to the coupling 152 of the torque blade 122 when engaged with the pin 148 (as shown in FIG. 10). A retaining ring 204 is mounted to the front face of the driver 150 and the turn piece spring 188 resides within the retaining ring 204.

The driver 150 includes a forward facing projection 208 that is disposed between the two ends of the turn piece spring 188. When the manual exterior turn piece 146 is rotated, the driver 150 rotates as well, causing the forward facing projection 208 to rotate and compressing the turn piece spring 188. Accordingly, when the manual exterior turn piece 146 is released, the turn piece spring 188 will apply a biasing force against the forward facing projection 208, thereby causing the manual exterior turn piece 146 to return to a single, default position (e.g., upright in the example shown herein).

As best shown in FIGS. 12-15, the pin 148, the pin spring 168, the coupling 152, and the driver 150 are illustrated. The pin 148 is depressible (e.g., via the motor 160 driving the transmission spring 164 and as shown in FIGS. 9 and 10 described above), from a disengaged position shown in FIGS. 12 and 13 to an engaged position shown in FIGS. 14 and 15.

Figure 12:
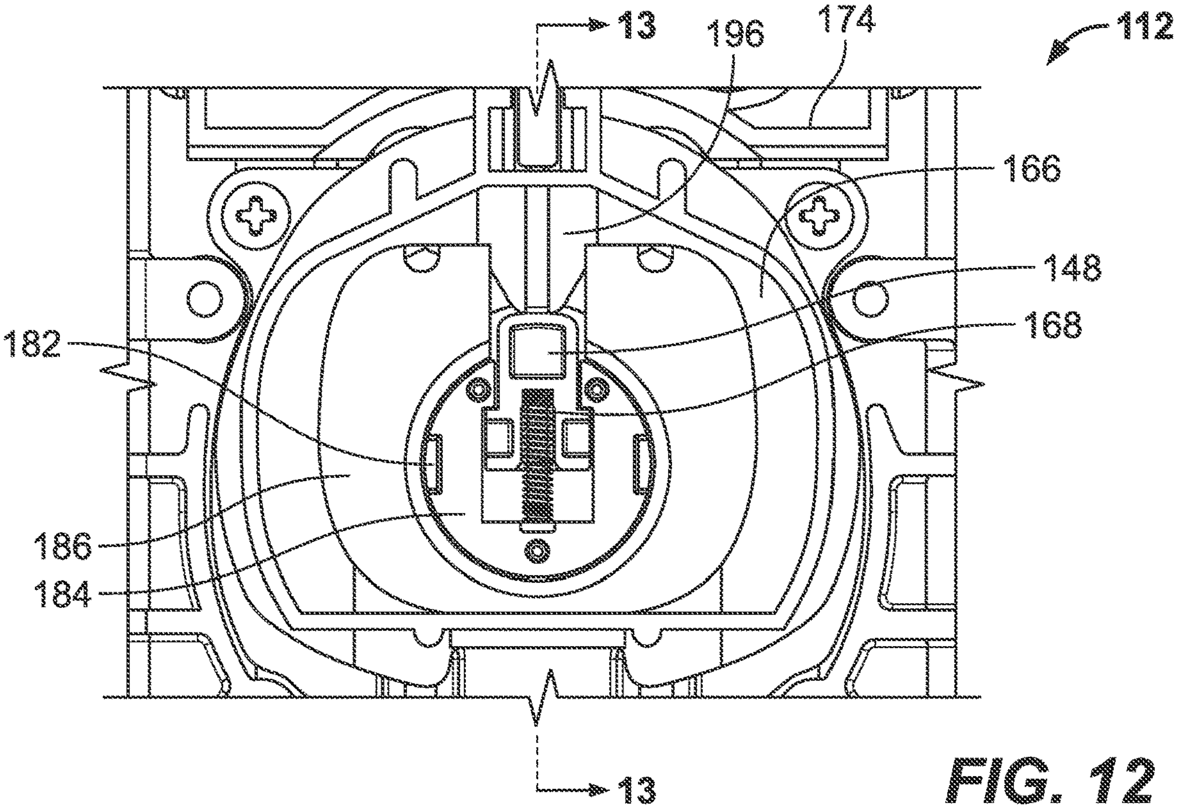
FIG. 12 illustrates a rear internal view of the exterior assembly with a pin in a disengaged position.
Figure 13:
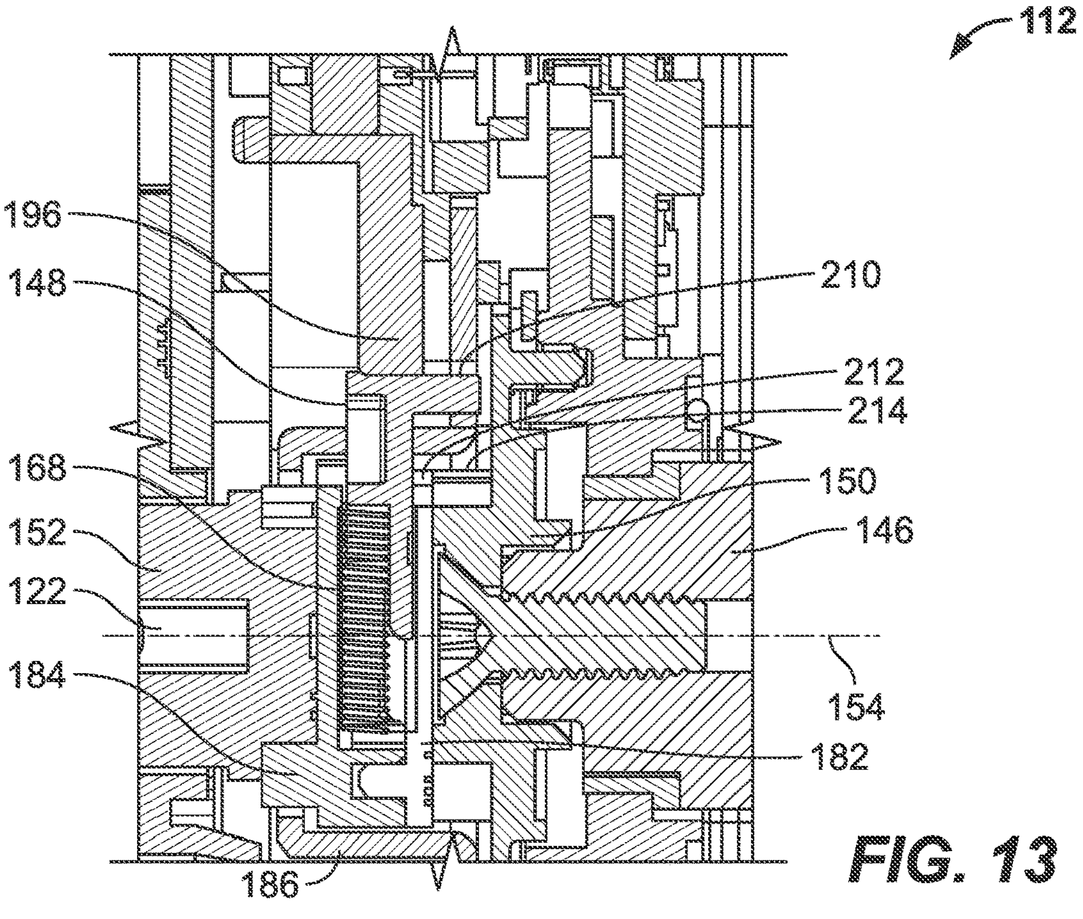
FIG. 13 illustrates a cross sectional view of the pin shown in FIG. 12 taken along line 13-13.

Starting with FIGS. 12 and 13, FIG. 12 illustrates a rear internal view of the exterior assembly 112 with the pin 148 in a disengaged position. FIG. 13 illustrates a cross sectional view of the pin 148 shown in FIG. 12 taken along line 13-13. Referring concurrently to FIGS. 12 and 13, in the disengaged position, the transmission spring 164 (shown in FIG. 9) is in its neutral position so that the pin spring 168 urges the pin 148 in the upward direction so as to decouple the driver 150 from the coupling 152 that is attached to the end of the torque blade 122. The pin 148 is positioned around the pin spring 168, which is positioned to bias the pin 148 and the actuator 166 upwardly toward the cradle 174.

The pin spring 168 is captured within a cavity defined by the pin 148, the pin cover 182, and the pin housing 184. The pin housing 184 couples to the coupling 152 with the pin cover 182 coupled to the pin housing 184 so that the pin 148 and the pin spring 168 can rotate with the torque blade 122. In the disengaged position, the pin 148 is in an upward position relative to the driver 150 so that the pin 148 is decoupled from the driver 150. As such, rotation of the manual exterior turn piece 146 around the axis 154 does not drive corresponding rotation of the torque blade 122. Rather, the turn piece 146 and the driver 150 are essentially freely rotatable relative to the pin 148 and the torque blade 122 and so that the deadbolt latch assembly 110 (shown in FIG. 3) cannot be locked or unlocked. The pin 148 also positions the actuator 166 in its first position via the pin portion 196 relative to the guide plate 186.

The pin 148 has a substantially L-shaped body with a tab 210 extending therefrom. In the disengaged position, the tab 210 is raised out of corresponding receivers 212, 214 (e.g., notches) in both of the pin cover 182 and the driver 150. The pin cover 182 and the driver 150 being positioned directly adjacent to one another along the axis 154, but not coupled together without the use of the pin 148. This positioning allows the driver 150, and thus, the turn piece 146 to rotate relative to the pin cover 182. In the unengaged position, the pin spring 168 will lift the pin 148 away from the driver piece 150 and the pin cover 182, thereby disengaging the driver piece 150 from the coupling 152. In this configuration, the manual exterior turn piece 146 and driver piece 150 may be rotatable, but are not engaged with the coupling 152 or torque blade 122.

Figure 14:
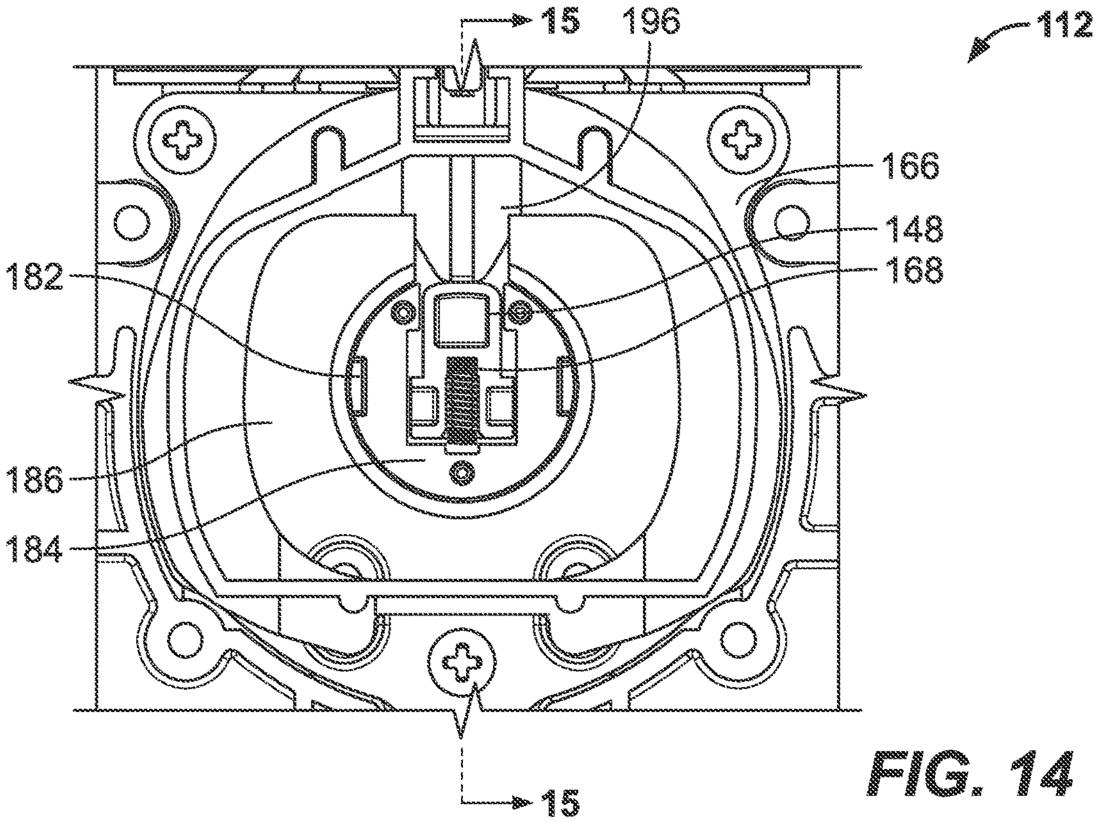
FIG. 14 illustrates a rear internal view of the exterior assembly with the pin in an engaged position.
Figure 15:
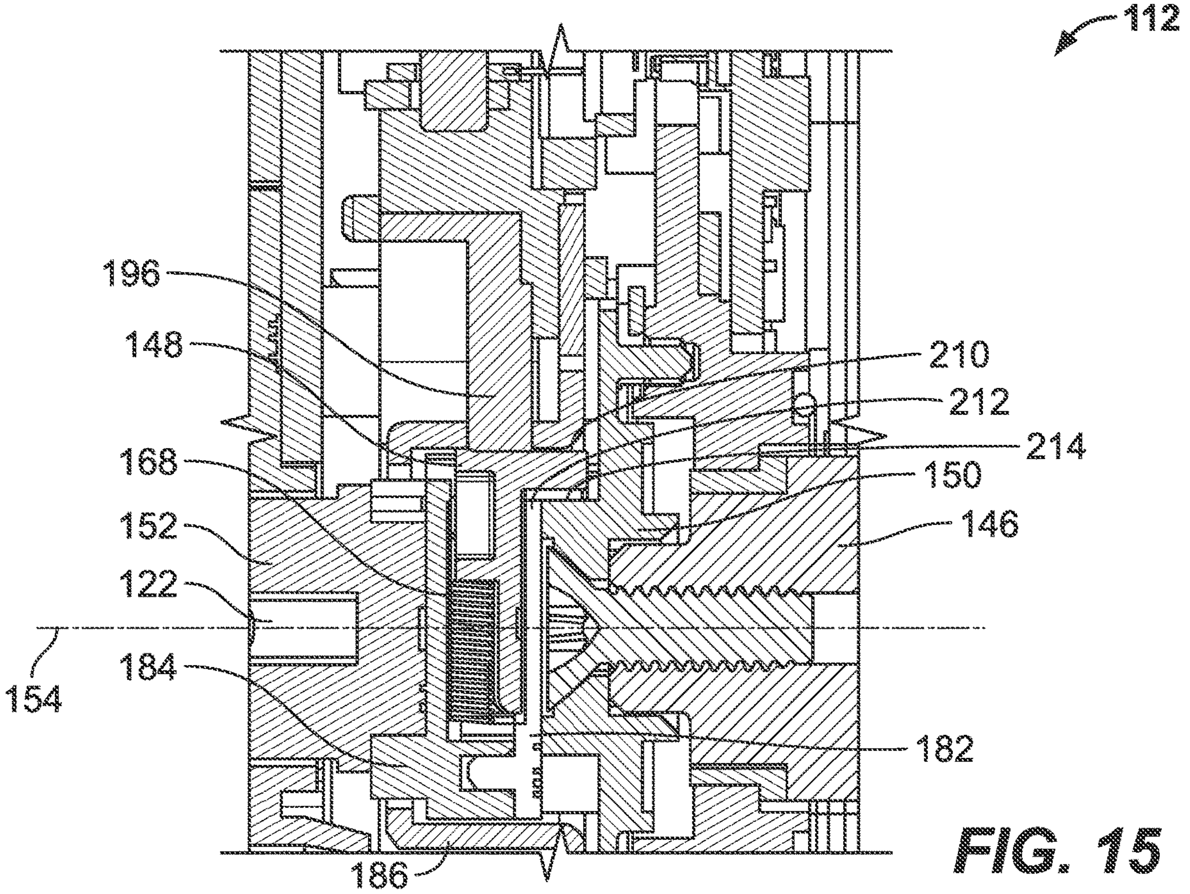
FIG. 15 illustrates a cross sectional view of the pin shown in FIG. 14 taken along line 15-15.

FIG. 14 illustrates a rear internal view of the exterior assembly 112 with the pin 148 in an engaged position. FIG. 15 illustrates a cross sectional view of the pin 148 shown in FIG. 14 taken along line 15-15. Referring concurrently to FIGS. 14 and 15, certain components are described above, and thus, are not necessarily described further. In the example, the pin 148 will, in the engaged position, contact an engagement portion of the driver 150 as well as the pin cover 182. In particular, the pin 148 is depressible into and fits the receiver 214 of the driver 150 and the similar receiver 212 of the pin cover 182. The pin cover 182 is fixedly coupled to coupling 152, e.g., via the pin housing 184. Accordingly, the pin 148 rotatably couples the manual exterior turn piece 146 and the driver piece 150 to the coupling 152 and the torque blade 122 in the engaged position. In this configuration, rotation of the turn piece 146 will drive corresponding rotation around the axis 154 of the torque blade 122 because the driver 150 and the pin 148 are engaged so as to allow rotation movement to be transferred therebetween.

Figure 16:
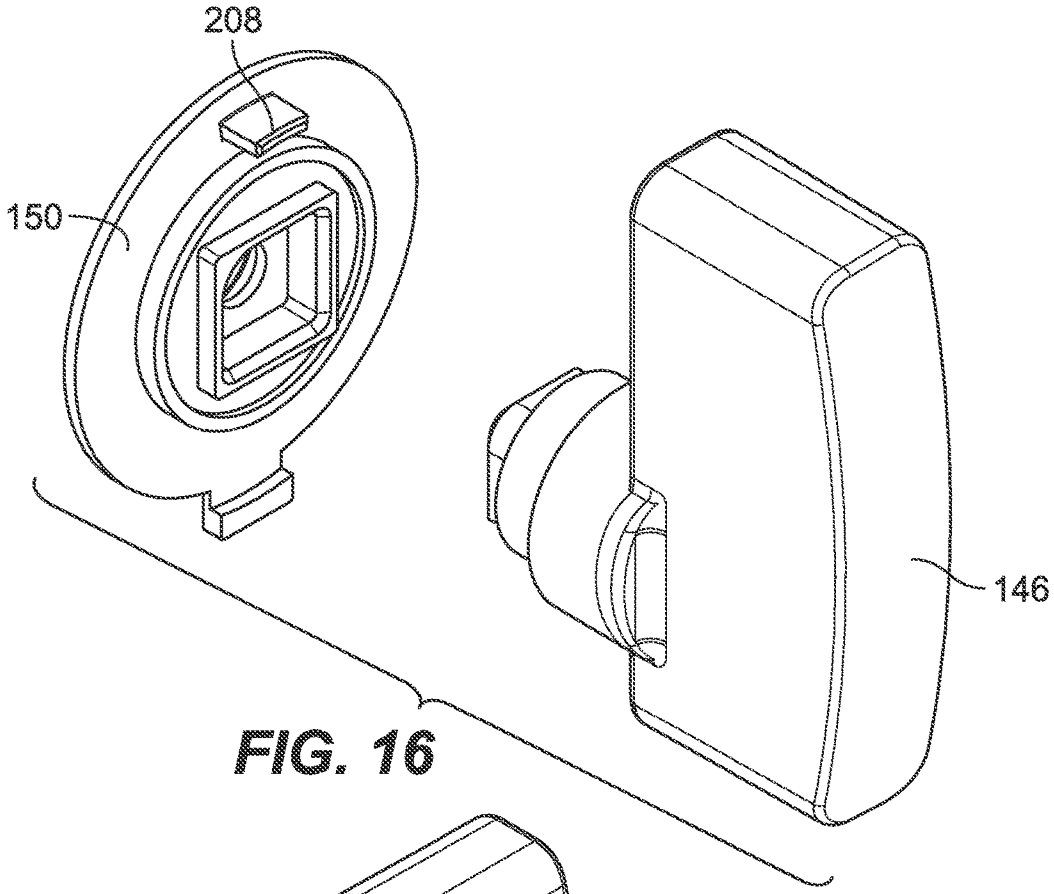
FIGS. 16 and 17 illustrate front and rear perspective views, respectively, of a manual external turn piece and a driver usable within the exterior assembly.
Figure 17:
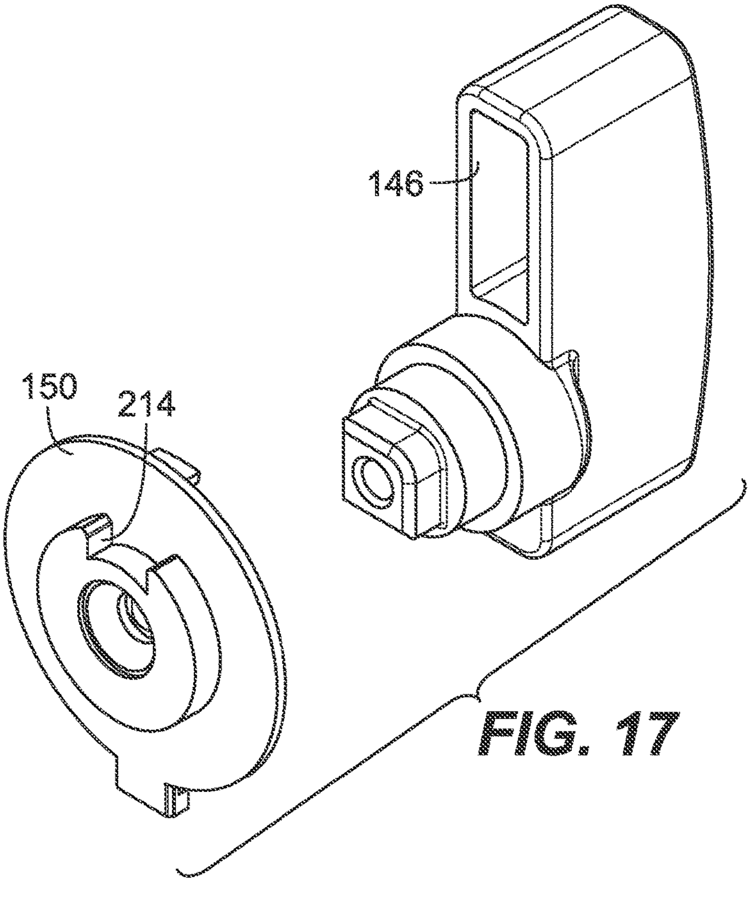

FIGS. 16 and 17 illustrate front and rear perspective views, respectively, of a manual exterior turn piece 146 and the driver 150 usable within the exterior assembly 112 (shown in FIGS. 12-15). The forward facing projection 208 extends from the front of the driver 150 and is configured to selectively engage the turn piece spring 188 (shown in FIG. 11). Additionally, the turn piece 146 is keyed to the front surface of the driver 150 so that rotational movement is transferred therebetween. The rear side of the driver 150 includes the receiver 214 that is configured to selectively engage with the pin 148 as shown in FIGS. 12-15 and described above. The pin 148 is configured to go in and out of the receiver 214 on the driver 150 so as to engage and disengage the torque blade to the driver. The pin 148 is secured to the pin housing 184 and is always engaged with the pin housing 184 since it is at least partially inside the pin housing 184.

Figure 18:
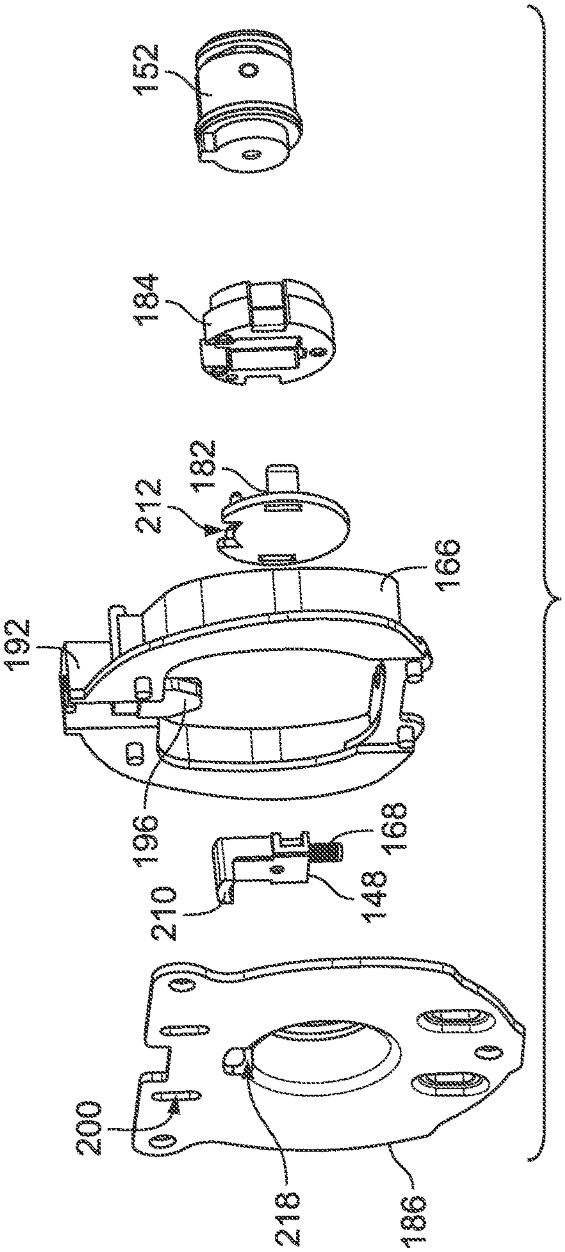
FIGS. 18 and 19 illustrate front and rear perspective views, respectively, of a coupling, a pin housing, a plate, an actuator, a guide plate, and the pin usable within the exterior assembly.
Figure 19:
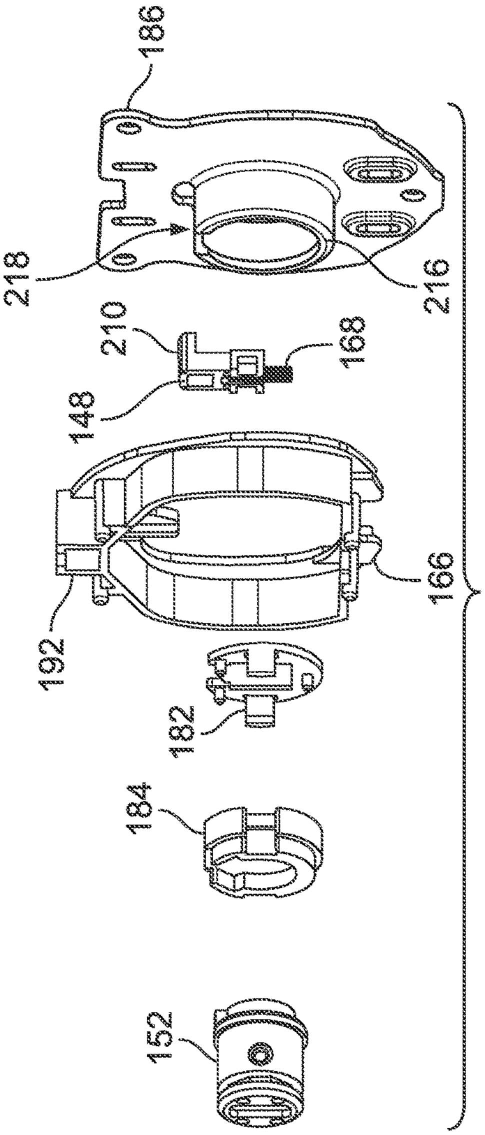

FIGS. 18 and 19 illustrate front and rear perspective views, respectively, of the coupling 152, the pin housing 184, the pin cover 182, the actuator 166, the guide plate 186, and the pin 148 usable within the exterior assembly 112 (shown in FIGS. 12-15). Certain components are described above, and thus, are not necessarily described further. The pin housing 184 attaches to the coupling 152 so that rotational movement can be transferred. The pin cover 182 couples to the pin housing 184 so as to define a cavity that at least partially receives the pin 148 and the pin spring 168. The actuator 166 and the guide plate 186 at least partially surrounds these components. The guide plate 186 defines an opening with a flange 216 that has a gap 218 at the top. At least a portion of the tab 210 of the pin 148 may be received within the gap 218 when in the disengaged position. In contrast, when the pin 148 is in the engaged position, the tab 210 may be depressed within the flange 216 so that rotation may occur.

Figure 20:
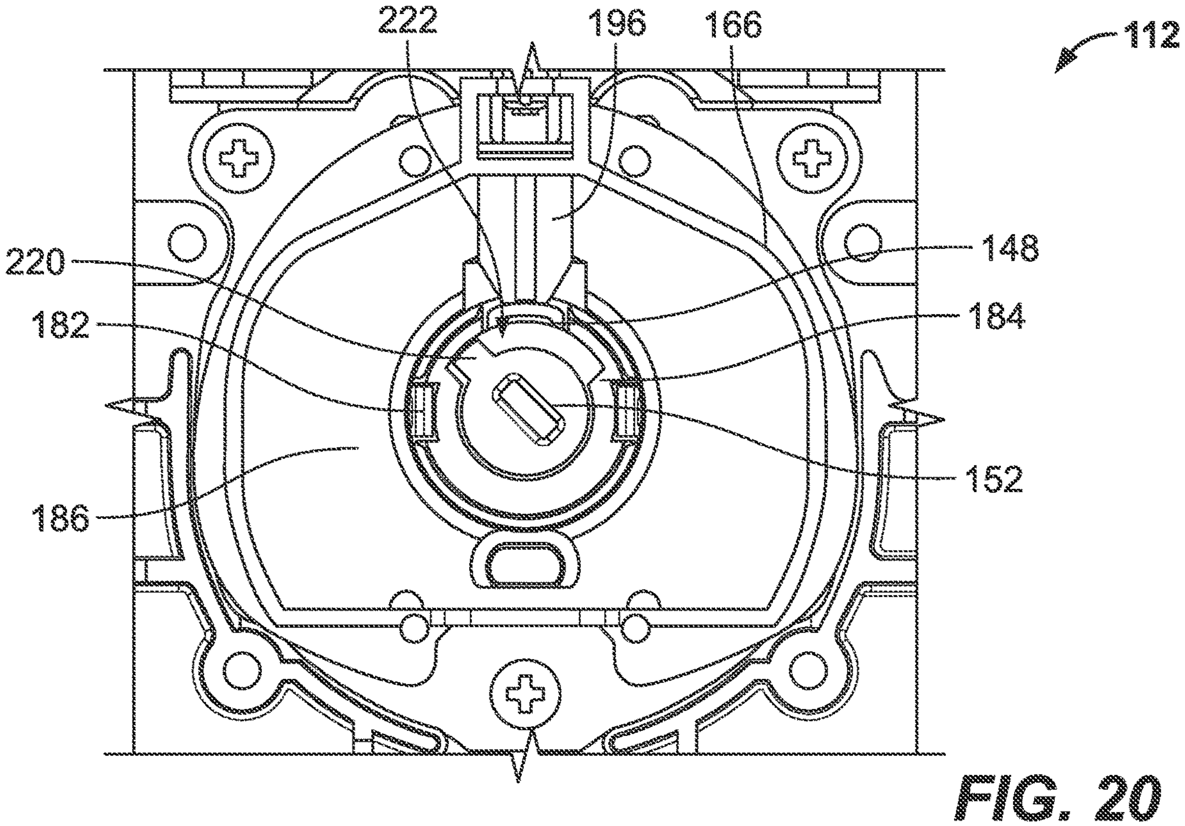
FIG. 20 illustrates an unlocked position of the exterior assembly in a right-handed configuration.
Figure 21:
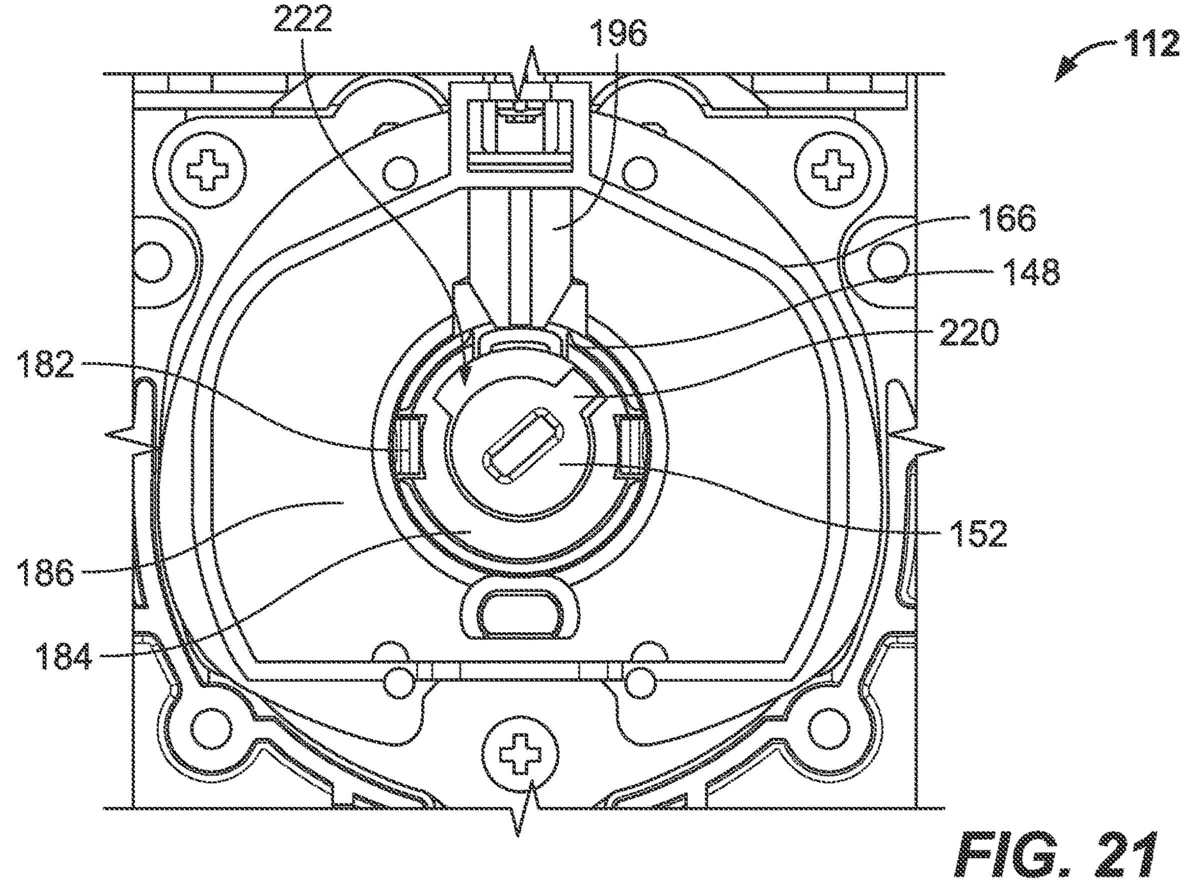
FIG. 21 illustrates an unlocked position of the exterior assembly in a left-handed configuration.

FIG. 20 illustrates an unlocked position of the exterior assembly 112 in a right-handed configuration. FIG. 21 illustrates an unlocked position of the exterior assembly 112 in a left-handed configuration. Referring concurrently to FIGS. 20 and 21, in the example electronic lock arrangement described herein, it is possible to install such a lock in either a right-handed or left-handed door configuration. As such, the electronic lock and the exterior assembly 112 is generally configured such that an orientation of internal components is symmetrical relative to the vertical axis, causing operation and range of motion to be equivalent regardless of the handed installation of the electronic lock.

In the example, the actuator 166 is shown in the engaged position, with the pin portion 196 depressing the pin 148 so as to engage with the driver 150 (shown in FIGS. 16 and 17) via the pin housing 184 and the pin cover 182. In the example, the coupling 152 includes a protrusion 220 that is received within a recess 222 defined within the pin housing 184. The recess 222 has a larger angular length than the protrusion 220. The protrusion 220 is positionable at either end of the recess 222 depending on the handed installation of the electronic lock and the coupling 152 is engaged with the pin housing 184 so that to move towards a locked position, the pin housing 184 drives the coupling 152 so that rotational movement is transferred and the torque blade is rotated. For example, as shown in FIG. 20, once the pin 148 is engaged, a user may turn the manual exterior turn piece 146 counterclockwise to move the driver 150 (also shown in FIGS. 16 and 17), and thus, the coupling 152 via the pin housing 184 from the unlocked position towards a locked position which drives rotation of the torque blade 122 and operation of the deadbolt latch assembly 110 (both shown in FIG. 3). Similarly, as shown in FIG. 21, once the pin 148 is engaged, a user may turn the manual exterior turn piece 146 clockwise move the driver 150, and thus, the coupling 152 from the unlocked position towards a locked position which drives rotation of the torque blade 122 and operation of the deadbolt latch assembly 110.

Figure 22:
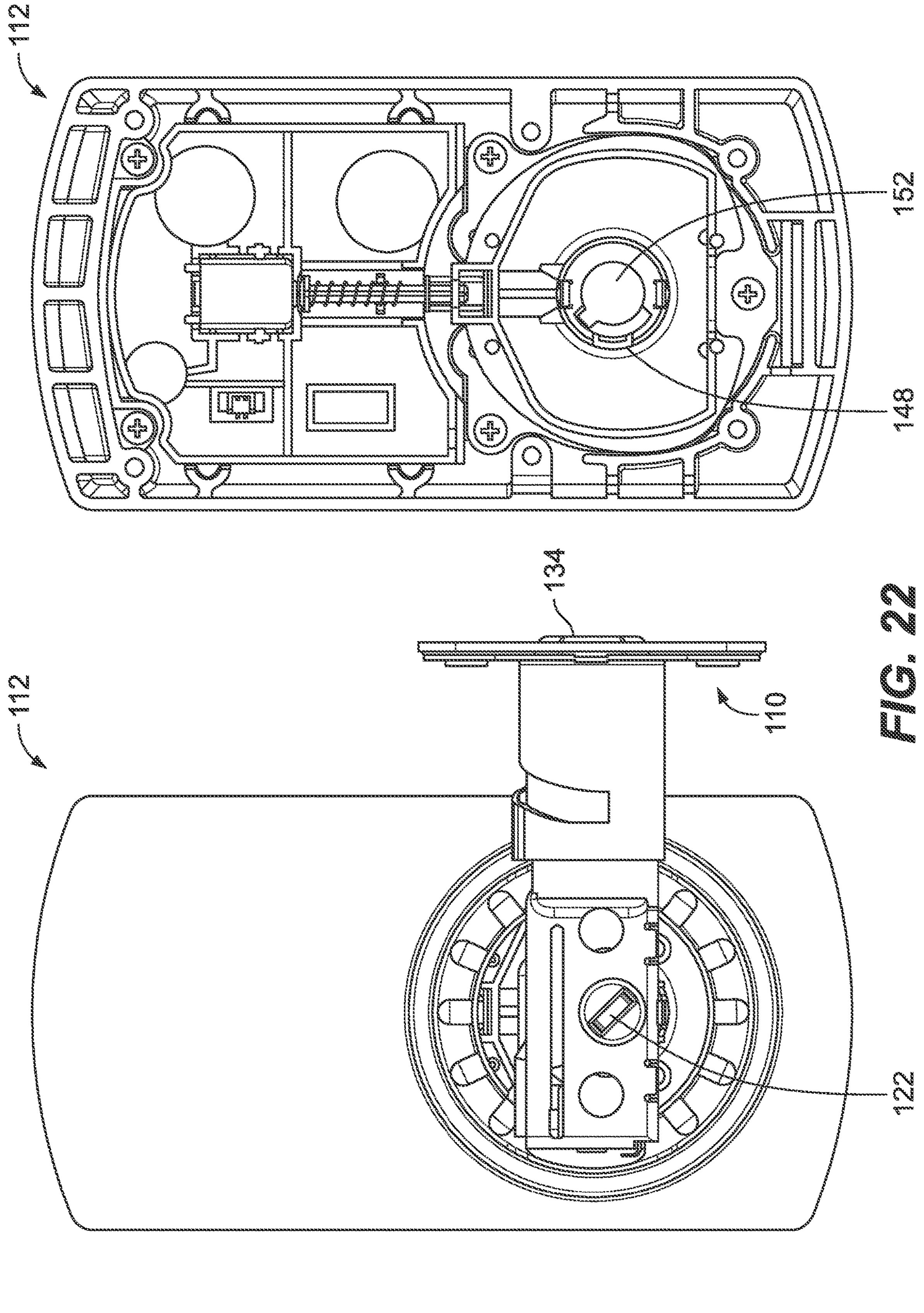
FIG. 22 illustrates a right-handed configuration of the exterior assembly and the deadbolt latch assembly in an unlocked position.

FIG. 22 illustrates a right-handed configuration of the exterior assembly 112 and the deadbolt latch assembly 110 in an unlocked position. In the unlocked position, the position of the coupling 152, and thus the torque blade 122, corresponds to the latch bolt 134 of the deadbolt latch assembly 110 being retracted. In the right-handed configuration, rotation of the exterior turn piece 146 (shown in FIGS. 16 and 17) in a clockwise direction causes the latch bolt 134 to retract. Rotation of the coupling 152 by the turn piece 146 is enabled by the pin 148 being in the engaged position as illustrated.

Figure 23:
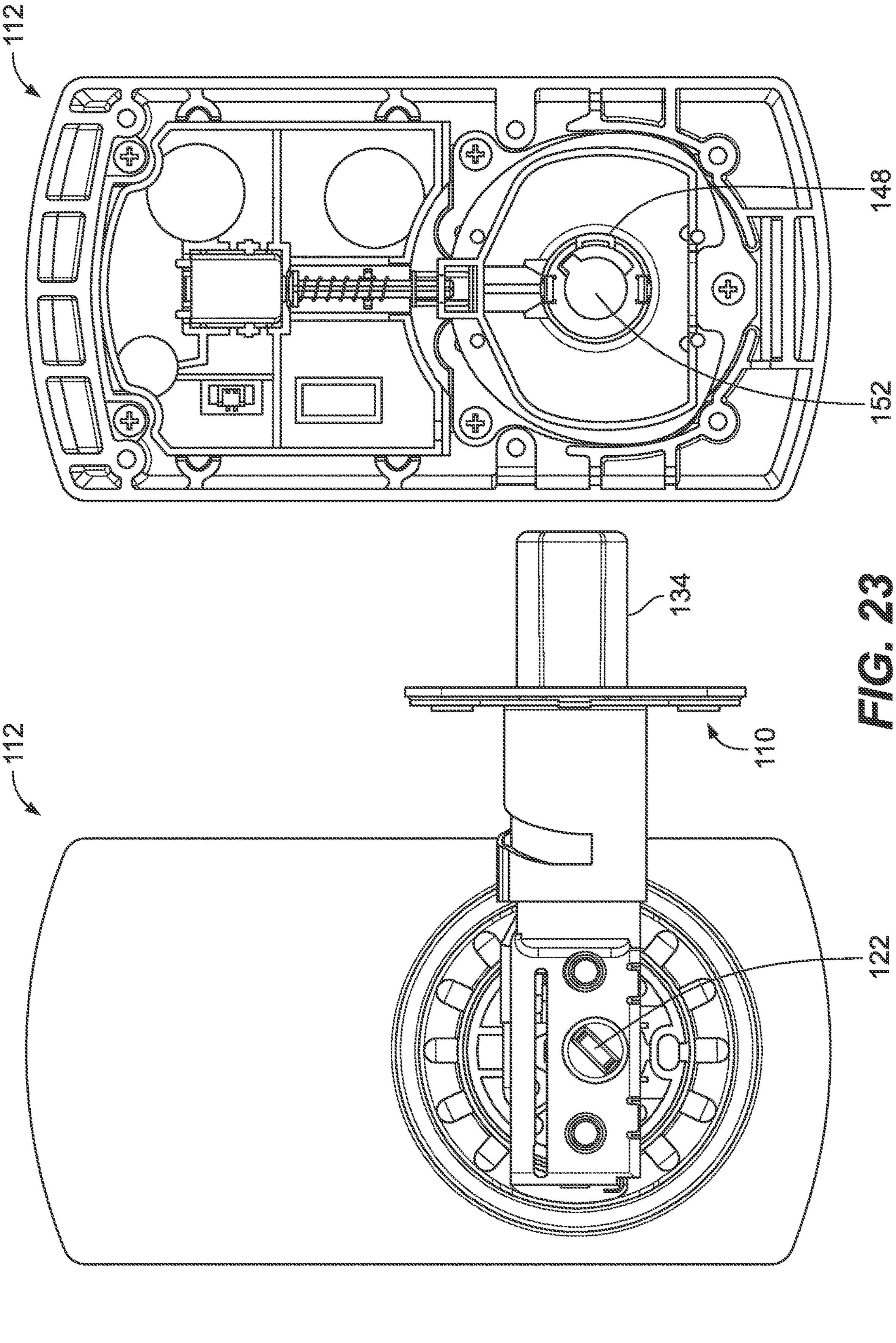
FIG. 23 illustrates a right-handed configuration of the exterior assembly and the deadbolt latch assembly in a locked position.

FIG. 23 illustrates a right-handed configuration of the exterior assembly 112 and the deadbolt latch assembly 110 in a locked position. In the locked position, the position of the coupling 152, and thus the torque blade 122, corresponds to the latch bolt 134 of the deadbolt latch assembly 110 being extended. In the right-handed configuration, rotation of the exterior turn piece 146 in a counterclockwise direction caused the latch bolt 134 to extend or be thrown.

Figure 24:
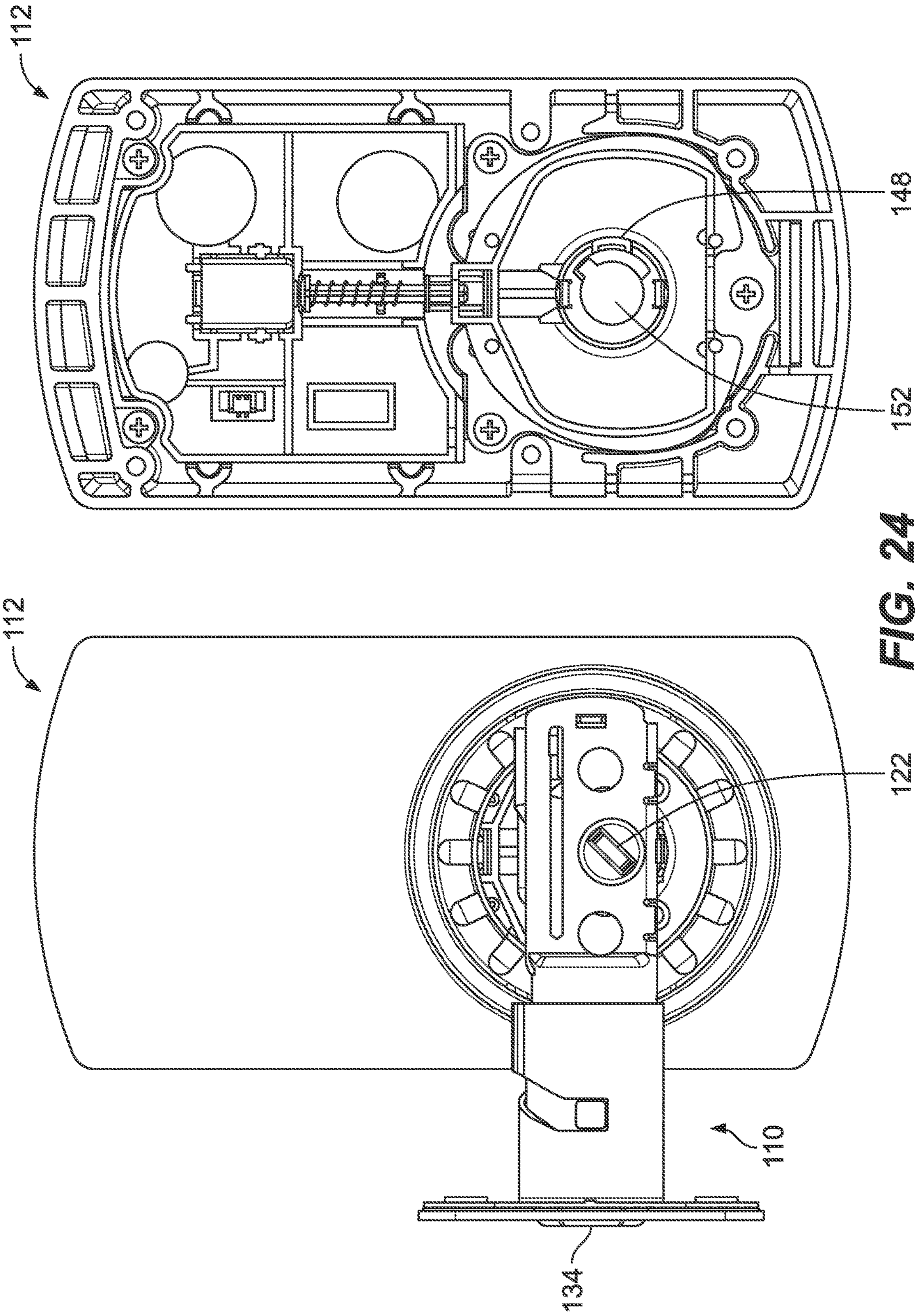
FIG. 24 illustrates a left-handed configuration of the exterior assembly and the deadbolt latch assembly in an unlocked position.

FIG. 24 illustrates a left-handed configuration of the exterior assembly 112 and the deadbolt latch assembly 110 in an unlocked position. In the unlocked position, the position of the coupling 152, and thus the torque blade 122, corresponds to the latch bolt 134 of the deadbolt latch assembly 110 being retracted. In the left-handed configuration, rotation of the exterior turn piece 146 in a counterclockwise direction causes the latch bolt 134 to retract. Rotation of the coupling 152 by the turn piece 146 is enabled by the pin 148 being in the engaged position as illustrated.

Figure 25:
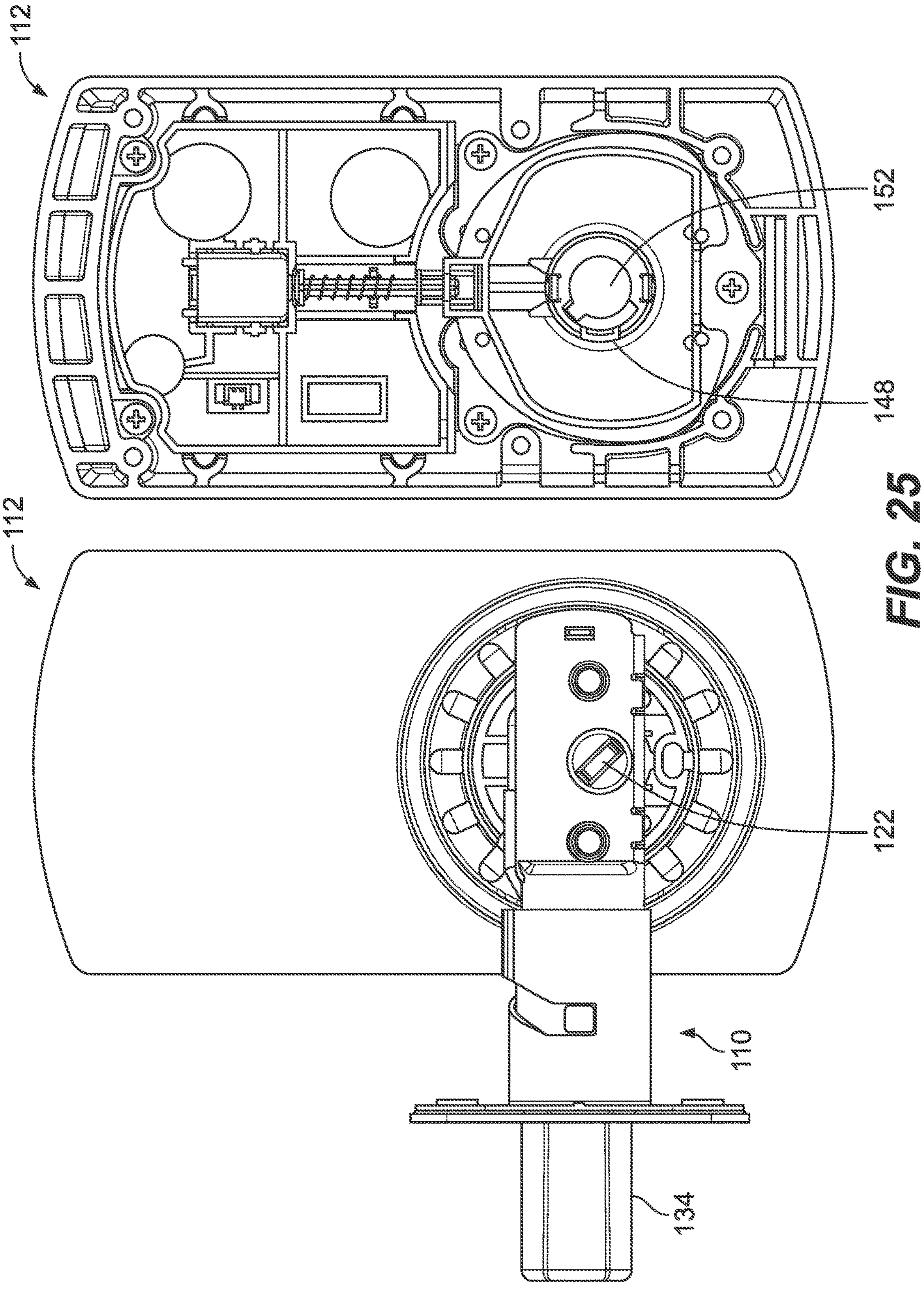
FIG. 25 illustrates a left-handed configuration of the exterior assembly and the deadbolt latch assembly in a locked position.

FIG. 25 illustrates a left-handed configuration of the exterior assembly 112 and the deadbolt latch assembly 110 in a locked position. In the locked position, the position of the coupling 152, and thus the torque blade 122, corresponds to the latch bolt 134 of the deadbolt latch assembly 110 being extended. In the left-handed configuration, rotation of the exterior turn piece 146 in a clockwise direction caused the latch bolt 134 to extend or be thrown.

Referring concurrently to FIGS. 22 and 25, the orientation of the coupling 152 is the same, but the position of the latch bolt 134 is opposite because of the opposite hand installation on the door. As such, rotating the turn piece clockwise will retract the latch bolt 134 for the right-hand installation, while extending the latch bolt 134 for the left-hand installation. Similarly, referring concurrently to FIGS. 23 and 24, the orientation of the coupling 152 is the same, but the position of the latch bolt 134 is opposite because of the opposite hand installation on the door. As such, rotating the turn piece counterclockwise will extend the latch bolt 134 for the right-hand installation, while retracting the latch bolt 134 for the left-hand installation.

Figure 26:
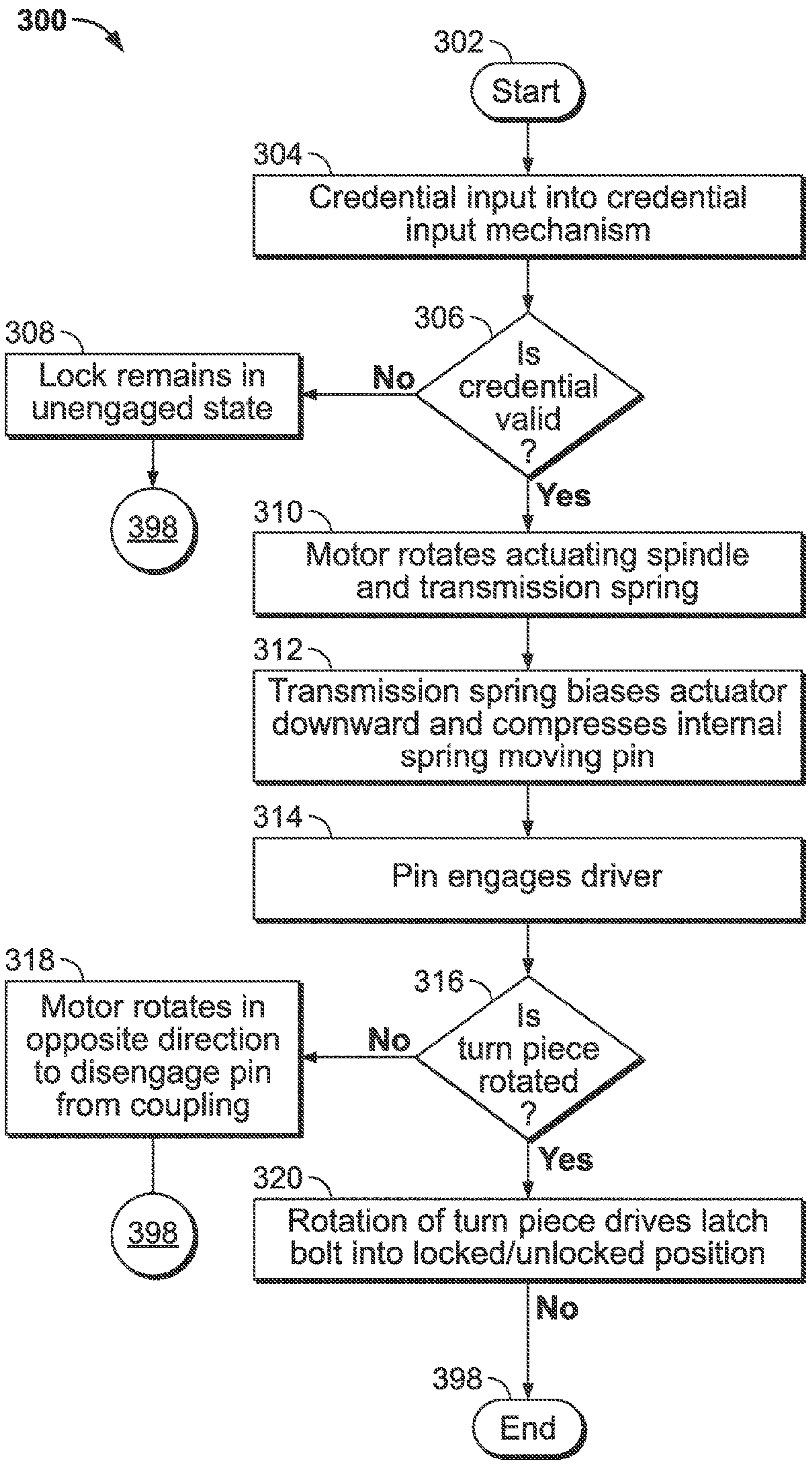
FIG. 26 illustrates a flowchart of a method of how the example electronic lock can be used to lock and unlock a door.

FIG. 26 illustrates an example flowchart of a method 300 for using the electronically-controlled, manually-actuated electronic lock 100 to lock and unlock the door 104 (shown in FIG. 1). With reference also back to FIG. 7, the method 300 starts at OPERATION 302 and proceeds to OPERATION 304 where one or a combination of electronic credentials are received via the credential input mechanism 156. For example, the electronic credential may be a passcode or security token entered via a keypad by a user, a user biometric input received via a biometric sensor, a wireless signal received via a wireless interface, or other electronic credential that may be verified by the control circuit 158 for authentication of a user.

At DECISION OPERATION 306, a determination may be made as to whether the received credential is valid. For example, the control circuit 158 is coupled in electrical communication with the credential input mechanism 156, and is configured with control logic to discriminate between a valid input credential and an invalid input credential input/provided by a user, a user computing device, an RFID chip, an electronic key fob, etc., via the credential input mechanism 156. When a determination is made that an invalid input credential is received, the motor 160 does not actuate and the electronic lock 100 remains in an unengaged state at OPERATION 308, where the exterior actuating assembly 130 is drivably decoupled from the torque blade 122, and the manual exterior turn piece 146 is incapable of rotating the torque blade 122 around axis 154 (shown in FIG. 3) to operate the latch bolt 134. When a determination is made that a valid input credential is received, the method 300 proceeds to OPERATION 310.

At OPERATION 310, the control circuit 158 provides a signal to the motor 160, which actuates the motor 160 to rotate the actuating spindle 162. As described above, rotation of the actuating spindle 162 causes the transmission spring 164 to move downward along the actuating spindle 162 away from the motor 160 and toward the movable actuator 166 to the biasing position. At OPERATION 312, the transmission spring 164 engages and biases the actuator 166 downward, which compresses the pin spring 168, and at OPERATION 314, the pin 148 is pushed downward by the pin portion 196 (shown in FIG. 10) of the actuator 166, to the engaged position. In the engaged position, the pin 148 couples the driver piece 150 with the coupling 152 (via the pin cover 182 and pin housing 184 shown in FIGS. 20 and 21), and the electronic lock 100 is in an engaged state. Accordingly, the manual exterior turn piece 146 is drivably coupled to the deadbolt latch assembly 110, which allows for manual rotation of the manual exterior turn piece 146 to retract or extend the latch bolt 134.

At DECISION OPERATION 316, if the manual exterior turn piece 146 is not rotated within a predetermined period of time (e.g., 10 seconds, 15 seconds, or other period of time), at OPERATION 318, the motor 160 may automatically rotate the actuating spindle 162 in an opposite direction, which causes the transmission spring 164 to move upward to the neutral position, which disengages the pin 148 from the driver piece 150 and coupling 152, and places the electronic lock 100 in a disengaged state. If the manual exterior turn piece 146 is rotated within the predetermined period of time, at OPERATION 320, rotation of the manual exterior turn piece 146 rotates the torque blade 122, which drives the latch crank 136 to extend or retract the latch bolt 134 into an unlocked or locked position. Advantageously, battery life can be extended due to the bolt action being manually driven by a user, rather than electrically driven by the battery. Additionally, the manually-driven bolt action may provide ample force to retract and/or extend the latch bolt 134 through a misaligned strike plate (not shown), such as may be the case when a warped door condition is experienced. Accordingly, the warped door condition may be overcome, and without requiring battery power to electrically drive the latch bolt 134. The method 300 ends at OPERATION 398.

Figure 27:
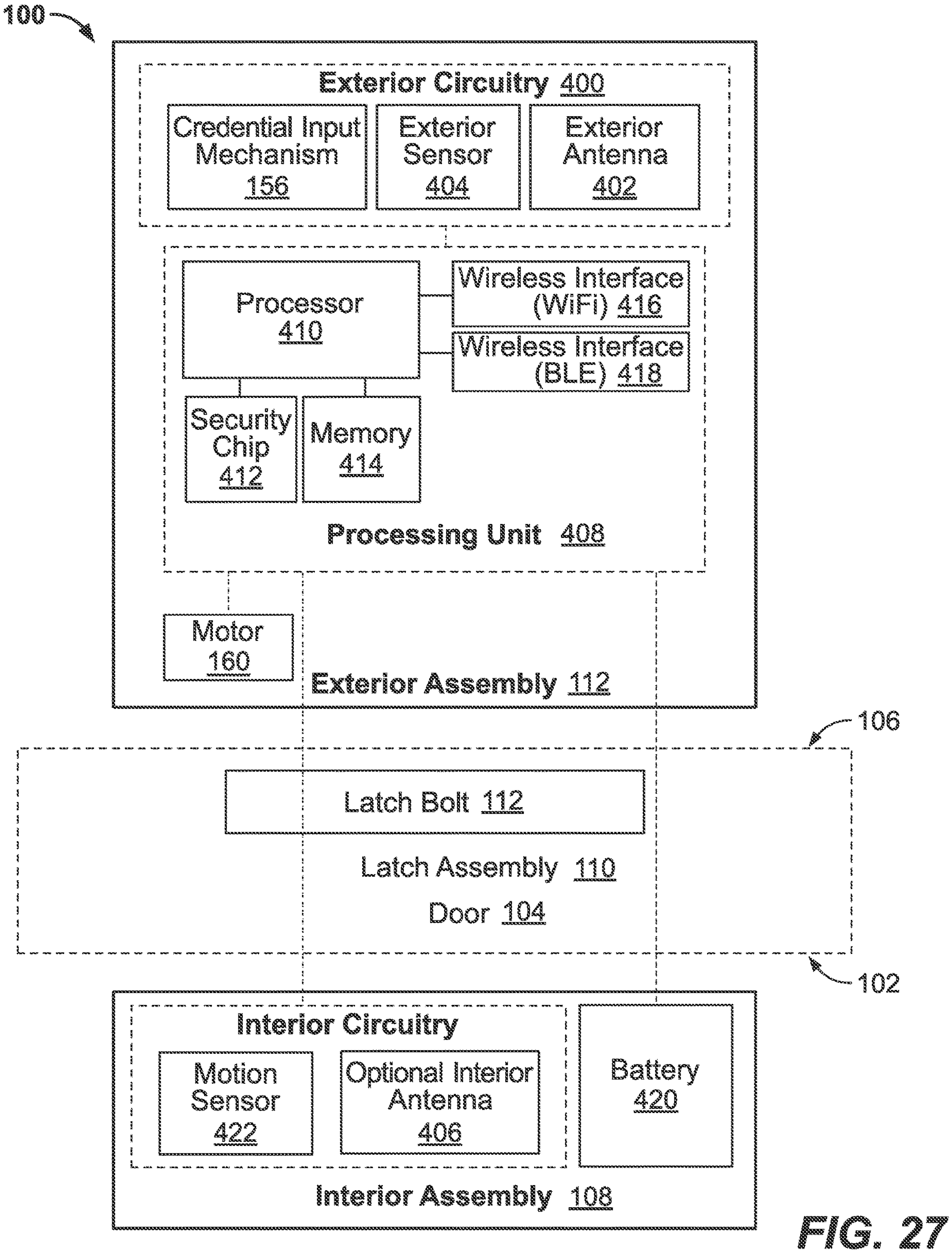
FIG. 27 illustrates a schematic representation of the electronic lock seen in the environment of FIG. 1.

FIG. 27 is a schematic representation of the electronic lock 100 mounted to the door 104. The interior assembly 108, the exterior assembly 112, and the deadbolt latch assembly 110 are also shown.

The exterior assembly 112 is shown to include various exterior circuitry 400 including the credential input mechanism 156 and an optional exterior antenna 402 usable for communication with a remote device. In addition, the exterior circuitry 400 can include one or more sensors 404, such as a camera, proximity sensor, or other mechanism by which conditions exterior to the door 104 can be sensed. In response to such sensed conditions, notifications may be sent by the electronic lock 100 to a server or a user's mobile device including information associated with a sensed event (e.g., time and description of the sensed event, or remote feed of sensor data obtained via the sensor).

The exterior antenna 402 is capable of being used in conjunction with an interior antenna 406, such that, for example, a processing unit 408 can determine where a mobile device is located, wherein only a mobile device that is paired with the electronic lock 100 and determined to be located on the exterior of the door 104 is able to actuate the motor 160 to place the electronic lock 100 in an engaged state. As can be appreciated, this can prevent unauthorized users from being located exterior to the door 104 of the electronic lock 100 and taking advantage of an authorized mobile device that may be located on the interior of the door 104, even though that authorized mobile device is not being used to actuate the motor 160. However, such a feature is not required, but can add additional security. In alternative arrangements, the motor 160 may be actuatable from either the credential input mechanism 156 or from an application installed on a user's mobile device. In such arrangements, the exterior antenna 402 and/or interior antenna 406 may be excluded.

The exterior assembly 112 may further include the processing unit 408 and the motor 160. As shown, the processing unit 408 includes at least one processor 410 communicatively connected to a security chip 412, a memory 414, various wireless communication interfaces (e.g., including a Wi-Fi® interface 416 and/or a Bluetooth® interface 418, and a battery 420). The processing unit 408 is capable of controlling the engagement state of the electronic lock 100 (e.g., by actuating the motor 160 to actuate and drivably couple the exterior actuating assembly 130 (shown in FIG. 7) to the deadbolt latch assembly 110.

In some examples, the processor 410 can process signals received from a variety of devices to determine whether the motor 160 should be actuated. Such processing can be based on a set of preprogramed instructions (i.e., firmware) stored in the memory 414. In certain embodiments, the processing unit 408 can include a plurality of processors 410, including one or more general purpose or specific purpose instruction processors. In some examples, the processing unit 408 is configured to capture a credential input event from a user and store the credential input event in the memory 414. In other examples, the processor 410 receives a signal from the exterior antenna 402, the interior antenna 406, or a motion sensor 422 (e.g., a vibration sensor, gyroscope, accelerometer, motion/position sensor, or combination thereof) and can validate received signals in order to actuate the motor 160 to control the engagement state of the electronic lock 100. In still other examples, the processor 410 receives signals from the Bluetooth® interface 418 to determine whether to actuate the motor 160.

In some embodiments, the processing unit 408 includes the security chip 412 that is communicatively interconnected with one or more instances of the processor 410. The security chip 412 can, for example, generate and store cryptographic information usable to generate a certificate usable to validate the electronic lock 100 with a remote system, such as a server or a mobile. In certain embodiments, the security chip 412 includes a one-time write function in which a portion of memory of the security chip 412 can be written only once, and then locked. Such memory can be used, for example, to store cryptographic information derived from characteristics of the electronic lock 100. Accordingly, once written, such cryptographic information can be used in a certificate generation process which ensures that, if any of the characteristics reflected in the cryptographic information are changed, the certificate that is generated by the security chip 412 would become invalid, and thereby render the electronic lock 100 unable to perform various functions, such as communicate with a server or mobile device, or operate at all, in some cases.

The memory 414 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically erasable programmable ROM, and other types of devices and/or articles of manufacture that store data. Computer storage media generally includes at least one or more tangible media or devices. Computer storage media can, in some examples, include embodiments including entirely non-transitory components.

As noted above, the processing unit 408 can include one or more wireless interfaces, such as the Wi-Fi® interface 416 and/or the Bluetooth® interface 418. Other RF circuits can be included as well. In the example shown, the Wi-Fi® interface 416 and/or the Bluetooth® interface 418 are capable of communication using at least one wireless communication protocol. In some examples, the processing unit 408 can communicate with a remote device via the Wi-Fi® interface 416, or a local device via the Bluetooth® interface 418. In some examples, the processing unit 408 can communicate with a mobile device and a server via the Wi-Fi® interface 416, and can communicate with a mobile device when the mobile device is in proximity to the electronic lock 100 via the Bluetooth® interface 418. In some embodiments, the processing unit 408 is configured to communicate with a mobile device via the Bluetooth® interface 418, and communications between the mobile device and the electronic lock 100 when the mobile device is out of range of Bluetooth® can be relayed via a server using the Wi-Fi® interface 416.

In example aspects, various wireless protocols can be used. For example, the electronic lock 100 can utilize one or more wireless protocols including, but not limited to, the IEEE 802.11 standard (Wi-Fi®), the IEEE 802.15.4 standard (Zigbee® and Z-Wave®), the IEEE 802.15.1 standard (Bluetooth®), a cellular network, a wireless local area network, near-field communication protocol, and/or other network protocols. In some examples, the electronic lock 100 can wirelessly communicate with networked and/or distributed computing systems, such as may be present in a cloud-computing environment.

According to an embodiment, the processor 410 may receive a signal at the Bluetooth® interface 418 via a wireless communication protocol (e.g., BLE) from a mobile device for communication of an intent to actuate the motor 160 to control the engagement state of the electronic lock 100. In some examples, the processor 410 may initiate communication with a server via the Wi-Fi® interface 416 (or another wireless interface) for purposes of validating an attempted actuation of the motor 160 to control the engagement state of the electronic lock 100, or receiving an actuation command to actuate the motor 160 to control the engagement state of the electronic lock 100. Additionally, various other settings can be viewed and/or modified via the Wi-Fi® interface 416 from a server; as such, a user of a mobile device may access an account associated with the electronic lock 100 to view and modify settings of that lock, which are then propagated from the server to the electronic lock 100. In alternative embodiments, other types of wireless interfaces can be used; generally, the wireless interface used for communication with a mobile device can operate using a different wireless protocol than a wireless interface used for communication with a server.

The exterior assembly 112 also includes the motor 160 that is capable of actuating the pin 148 (shown in FIG. 7). In use, the motor 160 receives an actuation command from the processing unit 408, which causes the motor 160 to actuate the pin 148 to place the electronic lock 100 in an engaged state. In some examples, the motor 160 actuates the pin to an opposing state. In some examples, the motor 160 receives a specified engage command responsive to a selection of the single-touch actuator (not shown), where the motor 160 only actuates the pin 148 if the latch bolt 134 is in the unlocked position. For example, if the door 104 is locked and the processing unit 408 receives an indication of a selection of a single-touch actuator, then no action is taken. If the latch bolt 134 is in the unlocked position and the processing unit 408 receives an indication of a selection of the single-touch actuator, then the motor 160 actuates the pin 148 to place the electronic lock 100 in an engaged state such that manual rotation of the manual exterior turn piece 146 extends the latch bolt 134 in the locked position.

The interior assembly 108 may include one or more batteries 420 to power the electronic lock 100. In one example, the batteries 420 may be a standard single-use (disposable) battery. Alternatively, the batteries 420 may be rechargeable. In still further embodiments, the batteries 420 are optional, replaced by an alternative power source (e.g., an AC power connection).

In alternative embodiments, the processing unit 408 may be located within the interior assembly 108. In such an arrangement the processing unit 408 may receive signals from the exterior circuitry 400, and may actuate the motor 160 via an electrical connection between the interior assembly 108 and the exterior assembly 112 through the bore 140 in the door 104 (shown in FIG. 3).

In still further example embodiments, the electronic lock 100 can include an integrated motion sensor 422. Using such a motion sensor 422 (e.g., an accelerometer, gyroscope, or other position or motion sensor) and wireless capabilities of a mobile device or an electronic device (i.e., fob) with these capabilities embedded inside can assist in determining additional types of events (e.g., a door opening or door closing event, a lock actuation or lock position event, or a knock event based on vibration of the door). In some cases, motion events can cause the electronic lock 100 to perform certain processing, e.g., to communicatively connect to or transmit data to a mobile device in proximity to the electronic lock 100. In alternative embodiments, other lock engagement sequences may not require use of a motion sensor 422. For example, if a mobile device is in valid range of the electronic lock 100 when using a particular wireless protocol (e.g., Bluetooth Low Energy), then a connection may be established with the electronic lock 100. Other arrangements are possible as well, using other connection sequences and/or communication protocols.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. An electronically-controlled, manually-actuated lock comprising:

a motor;

an actuating spindle actuatable by the motor and positioned to rotate around a first axis in response to actuation of the motor, the actuating spindle comprising a driving pin that engages a transmission spring such that, upon rotation of the actuating spindle, a position of the transmission spring changes relative to the driving pin along the first axis between a neutral position and a biasing position;

a drive mechanism including a coupling and a driver, wherein the coupling and the driver are axially aligned along, and rotatable around, a second axis that is orthogonal to the first axis;

a manual turn piece affixed to the driver and rotatable with the driver;

a pin coupled to the coupling and movable between an engaged position, in which the pin is coupled to the driver, and a disengaged position, in which the pin is disengaged from the driver, the pin being biased toward the disengaged position by a pin spring, wherein when the pin is in the engaged position, the second axis extends through both the pin and the pin spring;

a guide plate having a flange extending along the second axis defining an opening at least partially surrounding the drive mechanism and fixed relative thereto, wherein the flange has an inner surface;

an actuator slidably mounted on the guide plate and at least partially surrounding the drive mechanism, the actuator being engageable by the transmission spring at least when the transmission spring is in the biasing position, the actuator being movable between a first position and a second position, wherein:

the actuator remains in the first position when the transmission spring is in the neutral position;

the actuator is biased toward the second position when the transmission spring is in the biasing position; and biasing the actuator toward the second position compresses the pin spring, and pushes the pin toward the engaged position; and a deadbolt assembly including:

a deadbolt movable between a locked position and an unlocked position; and a torque blade rotatably coupled to the coupling and drivably coupled to the deadbolt, wherein, when the pin is in the engaged position, manual rotation of the manual turn piece rotates the torque blade and drives movement of the deadbolt between the locked position and the unlocked position and the pin rotates within the flange of the guide plate with the inner surface of the flange preventing the pin from moving towards the disengaged position.

2. The electronically-controlled, manually-actuated lock of claim 1, wherein the pin includes a tab and the driver includes a receiver, wherein, in the engaged position, the receiver engages with and at least partially surrounds the tab.

3. The electronically-controlled, manually-actuated lock of claim 1, wherein, in the engaged position, the pin, the driver, and the manual turn piece are coupled to the torque blade, such that rotation of the manual turn piece rotates each of the driver, the pin, and the torque blade.

4. The electronically-controlled, manually-actuated lock of claim 1, further comprising a circular spring, the circular spring biasing the manual turn piece toward a default position.

5. The electronically-controlled, manually-actuated lock of claim 1, wherein the actuator comprises a pin protrusion oriented toward the pin.

6. The electronically-controlled, manually-actuated lock of claim 1, wherein the pin and the pin spring are captured at least partially by a pin cover and a pin housing attached to the coupling.

7. The electronically-controlled, manually-actuated lock of claim 1, wherein the lock includes an exterior assembly, and wherein the motor, the actuating spindle, the drive mechanism, the pin, and the actuator are each included within the exterior assembly.

8. The electronically-controlled, manually-actuated lock of claim 1, further comprising an interior assembly including a manual turn piece coupled to the torque blade.

9. The electronically-controlled, manually-actuated lock of claim 1, wherein a biasing force of the pin spring is less than a biasing force applied by the transmission spring in the biasing position.

10. A method of actuating an electronic lock, the method comprising:

in response to receiving a valid user credential input, actuating a motor via a control circuit to rotate an actuating spindle around a first axis, the actuating spindle comprising a driving pin that engages a transmission spring to move the transmission spring along the first axis from a neutral position to a biasing position, wherein:

movement of the transmission spring to the biasing position biases a movable actuator from a first position to a second position;

biasing the movable actuator to the second position pushes a pin toward an engaged position, and in the engaged position, the pin rotationally joins a coupling of a torque blade to a driver of a manual turn piece on an exterior assembly of the electronic lock along a second axis, wherein the pin is coupled to the coupling and when in the engaged position, the pin rotates within a flange extending along the second axis and defining an opening of a guide plate at least partially surrounding the coupling and fixed relative thereto, the movable actuator slidably mounted to the guide plate, and wherein the flange has an inner surface such that the pin rotates within the flange of the guide plate with the inner surface of the flange preventing the pin from moving towards a disengaged position, wherein the pin is biased toward the disengaged position by a pin spring, and wherein when the pin is in the engaged position, the second axis extends through both the pin and the pin spring.

11. The method of claim 10, further comprising, in response to receiving a manual rotation of the manual turn piece around the second axis, rotating the torque blade around the second axis and driving a deadbolt between a locked position and an unlocked position.

12. The method of claim 11, wherein the second axis is generally perpendicular to the first axis.

13. The method of claim 10, wherein, in the engaged position, the pin is coupled to a receiver of the driver.

14. The method of claim 13, wherein, in the disengaged position, the pin is decoupled from the driver.

15. The method of claim 10, wherein receiving the user credential input comprises at least one of:

receiving a passcode input via a keypad;

receiving a biometric input via a biometric sensor; and receiving a wireless signal via a wireless interface.

16. The method of claim 10, further comprising, after a predetermined time period, actuating the motor via the control circuit to rotate the actuating spindle in an opposite direction around the first axis to move the position of the transmission spring from the biasing position to the neutral position and cause the movable actuator to move to the first position.

17. An electronic lock for use on a door separating an exterior space from a secured space, the electronic lock comprising:

a deadbolt assembly including:

a deadbolt movable between a locked position and an unlocked position; and a torque blade drivably coupled to the deadbolt;

an interior assembly comprising an interior manual turn piece operatively connected to the torque blade; and an exterior assembly comprising:

a motor;

an actuating spindle actuatable by the motor and positioned to rotate around a first axis in response to actuation of the motor, the actuating spindle comprising a driving pin that engages a transmission spring such that, upon rotation of the actuating spindle, a position of the transmission spring changes relative to the driving pin along the first axis between a neutral position and a biasing position;

a drive mechanism including a coupling and a driver, the coupling coupled to the torque blade, wherein the coupling and the driver are axially aligned along, and rotatable around, a second axis that is orthogonal to the first axis;

an exterior manual turn piece affixed to the driver and rotatable with the driver;

a pin coupled to the coupling and movable between an engaged position, in which the pin is coupled to the driver, and a disengaged position, in which the pin is disengaged from the driver, the pin being biased toward the disengaged position by a pin spring, wherein when the pin is in the engaged position, the second axis extends through both the pin and the pin spring; and a guide plate having a flange extending along the second axis defining an opening at least partially surrounding the drive mechanism and fixed relative thereto, wherein the flange has an inner surface;

an actuator slidably mounted on the guide plate and at least partially surrounding the drive mechanism, the actuator being engageable by the transmission spring at least when the transmission spring is in the biasing position, the actuator being movable between a first position and a second position, wherein:

the actuator remains in the first position when the transmission spring is in the neutral position;

the actuator is biased toward the second position when the transmission spring is in the biasing position; and biasing the actuator toward the second position compresses the pin spring, and pushes the pin toward the engaged position; and wherein, when the pin is in the engaged position, manual rotation of the exterior manual turn piece rotates the torque blade and drives movement of the deadbolt between the locked position and the unlocked position and the pin rotates within the flange of the guide plate with the inner surface of the flange preventing the pin from moving towards the disengaged position.

18. The electronic lock of claim 17, wherein, in the engaged position, the pin, the driver, and the exterior manual turn piece are coupled to the torque blade, such that rotation of the exterior manual turn piece rotates each of the driver, the pin, and the torque blade.

* * * * *